(12) United States Patent
Aggarwal et al.

(10) Patent No.: US 11,748,760 B2
(45) Date of Patent: Sep. 5, 2023

(54) METHOD AND SYSTEM FOR CONDUCTING TRANSACTIONS USING ELECTRONIC CHIP

(71) Applicant: MASTERCARD INTERNATIONAL INCORPORATED, Purchase, NY (US)

(72) Inventors: Anurag Aggarwal, Rewari (IN); Archit Umrao, Farrukhabad (IN); Amit Gupta, Dwark (IN); Aditya Koduri, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 539 days.

(21) Appl. No.: 16/906,654

(22) Filed: Jun. 19, 2020

(65) Prior Publication Data
US 2021/0004800 A1    Jan. 7, 2021

(30) Foreign Application Priority Data
Jul. 1, 2019   (SG) .......................... 10201906129Y

(51) Int. Cl.
| | |
|---|---|
| *G06Q 20/40* | (2012.01) |
| *G06Q 20/22* | (2012.01) |
| *G06Q 20/20* | (2012.01) |
| *H04L 9/40* | (2022.01) |
| *G06K 7/10* | (2006.01) |
| *G06Q 20/34* | (2012.01) |
| *G06Q 20/36* | (2012.01) |

(52) U.S. Cl.
CPC ....... *G06Q 20/405* (2013.01); *G06K 7/10297* (2013.01); *G06Q 20/204* (2013.01); *G06Q 20/206* (2013.01); *G06Q 20/227* (2013.01); *G06Q 20/40155* (2020.05); *H04L 63/08* (2013.01); *G06Q 20/341* (2013.01); *G06Q 20/3674* (2013.01); *G06Q 2220/00* (2013.01)

(58) Field of Classification Search
CPC ............. G06Q 20/3567; G06Q 20/352; G06Q 20/227; G06Q 20/322; G06Q 20/405; G06Q 10/067; G06Q 20/102; G06Q 30/0255; G06Q 20/20; G06Q 40/02; G06Q 20/04
USPC .................. 705/39, 44, 72, 75; 235/375, 380
See application file for complete search history.

(56) References Cited

U.S. PATENT DOCUMENTS 9,471,915 B2 * 10/2016 Fuerstenberg ....... G06Q 20/341
11,055,697 B2 * 7/2021 Ghanta ............. G06Q 20/3567
(Continued)

*Primary Examiner* — Olusegun Goyea
(74) *Attorney, Agent, or Firm* — Pillsbury Winthrop Shaw Pittman LLP

(57) ABSTRACT

A method and a system for conducting a transaction using an electronic chip are provided. One or more details of a plurality of payment modes and a first authentication parameter are stored in the electronic chip. The electronic chip receives an authentication request including a second authentication parameter from a terminal device when the transaction is initiated at the terminal device. The electronic chip compares the first and second authentication parameters, and communicates an authentication response including one or more details of a first payment mode of the plurality of payment modes to the terminal device based on a match between the first authentication parameter and the second authentication parameter. The transaction is processed based on the authentication response.

20 Claims, 21 Drawing Sheets

(56) References Cited

U.S. PATENT DOCUMENTS

| | | | |
|---|---|---|---|
| 2008/0010189 A1* | 1/2008 | Rosenberger | G06Q 40/02 |
| | | | 705/39 |
| 2008/0217400 A1* | 9/2008 | Portano | G06Q 20/403 |
| | | | 235/380 |
| 2015/0081550 A1* | 3/2015 | Priebatsch | G06Q 20/20 |
| | | | 705/44 |
| 2015/0127553 A1* | 5/2015 | Sundaram | G06Q 30/0255 |
| | | | 705/72 |
| 2016/0253669 A1* | 9/2016 | Yoon | G06Q 20/327 |
| | | | 705/75 |
| 2017/0004464 A1* | 1/2017 | Fuerstenberg | G06Q 20/102 |
| 2017/0200146 A1* | 7/2017 | Park | G06Q 20/3229 |
| 2017/0243192 A1* | 8/2017 | Andrews | G06Q 20/227 |
| 2017/0293909 A1* | 10/2017 | Song | G06Q 20/322 |
| 2017/0357962 A1* | 12/2017 | Ghanta | G06Q 20/3567 |
| 2018/0204418 A1* | 7/2018 | Birkenmeyer | G07F 17/3223 |
| 2018/0300526 A1* | 10/2018 | Cho | G06F 21/32 |

* cited by examiner

METHOD AND SYSTEM FOR CONDUCTING TRANSACTIONS USING ELECTRONIC CHIP

CROSS-REFERENCE TO RELATED APPLICATIONS

This application claims priority to Singaporean Application Serial No. 10201906129Y, filed Jul. 1, 2019, which is incorporated herein by reference in its entirety.

FIELD

Various embodiments of the disclosure relate generally to transaction processing systems. More specifically, various embodiments of the disclosure relate to a method and a system for conducting transactions using an electronic chip.

BACKGROUND

Emergence of transaction cards has revolutionized the way transactions are performed at terminal devices, such as automatic teller machines (ATMs), point-of-sale (POS) devices, or the like. A transaction conducted using a transaction card involves authentication of a user conducting the transaction and authorization of the transaction. Typically, an issuer of the transaction card is responsible for authenticating the user and authorizing the transaction. For authentication, the user provides an authentication parameter associated with the transaction card at the terminal device. The authentication parameter may be a one-time password (OTP), a personal identification number (PIN), or a biometric feature such as, a fingerprint, a faceprint, a voiceprint, a retina scan, or the like. The terminal device communicates the authentication parameter to the issuer. The issuer then authenticates the user based on the authentication parameter and communicates an authentication response, indicating a result of authentication, to the terminal device. Such to-and-fro communication between the issuer and the terminal device increases the processing time for the transaction and may cause inconvenience to the user, especially in times of an emergency. Moreover, when there is limited network connectivity between the terminal device and the issuer, the authentication process may fail and the transaction may be declined.

Offline authentication by using contactless transaction cards at the terminal device is a known solution to overcome the abovementioned problem. A contactless transaction card is usually embedded with an electronic chip that locally stores an authentication parameter associated with the contactless transaction card and details of the contactless transaction card. The electronic chip is a near field communication (NFC) enabled chip that communicates with the terminal device for facilitating offline authentication when a transaction is conducted. However, such contactless transaction cards are susceptible to skimming frauds, where fraudsters copy the details stored in the contactless transaction cards using portable NFC readers without the knowledge of the users and duplicate the cards for performing fraudulent transactions.

In light of the foregoing, there exists a need for a solution that solves the abovementioned problems and provides a mechanism to conduct secure and hassle-free transactions.

SUMMARY

In an embodiment of the disclosure, a method of conducting a transaction using an electronic chip is provided. An authentication request including a first authentication parameter of a user is received by the electronic chip from a terminal device, when the transaction is initiated at the terminal device. One or more details of a plurality of payment modes of the user are stored in the electronic chip. The electronic chip compares the first authentication parameter with a second authentication parameter that is stored in the electronic chip. An authentication response including one or more details of a first payment mode of the plurality of payment modes is communicated by the electronic chip to the terminal device. The authentication response is communicated based on a match between the first authentication parameter and the second authentication parameter and the transaction is processed based on the authentication response.

In another embodiment of the disclosure, an electronic chip for conducting a transaction is provided. The electronic chip includes circuitry configured to store a first authentication parameter and one or more details of a plurality of payment modes of the user. The circuitry is configured to receive an authentication request including a second authentication parameter of the user from a terminal device, when the transaction is initiated at the terminal device. The circuitry is configured to compare the second authentication parameter with the first authentication parameter and communicate an authentication response including one or more details of a first payment mode of the plurality of payment modes to the terminal device. The authentication response is communicated based on a match between the first authentication parameter and the second authentication parameter, and the transaction is processed based on the authentication response.

In another embodiment of the disclosure, a system for conducting a transaction is provided. The system includes a terminal device and an electronic chip. The terminal device is configured to receive a first authentication parameter of a user when a transaction is initiated by the user at the terminal device. The electronic chip is communicatively coupled to the terminal device and is configured to store a second authentication parameter and one or more details of a plurality of payment modes of the user. The electronic chip is configured to receive an authentication request including the first authentication parameter from the terminal device. The authentication request is received when the transaction is initiated at the terminal device. The electronic chip is configured to compare the first authentication parameter with the second authentication parameter and communicate an authentication response including one or more details of a first payment mode of the plurality of payment modes to the terminal device. The authentication response is communicated based on a match between the first authentication parameter and the second authentication parameter, and the transaction is processed based on the authentication response.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the disclosure are illustrated by way of example, and not limited by the appended figures, in which like references indicate similar elements.

Figure 1:
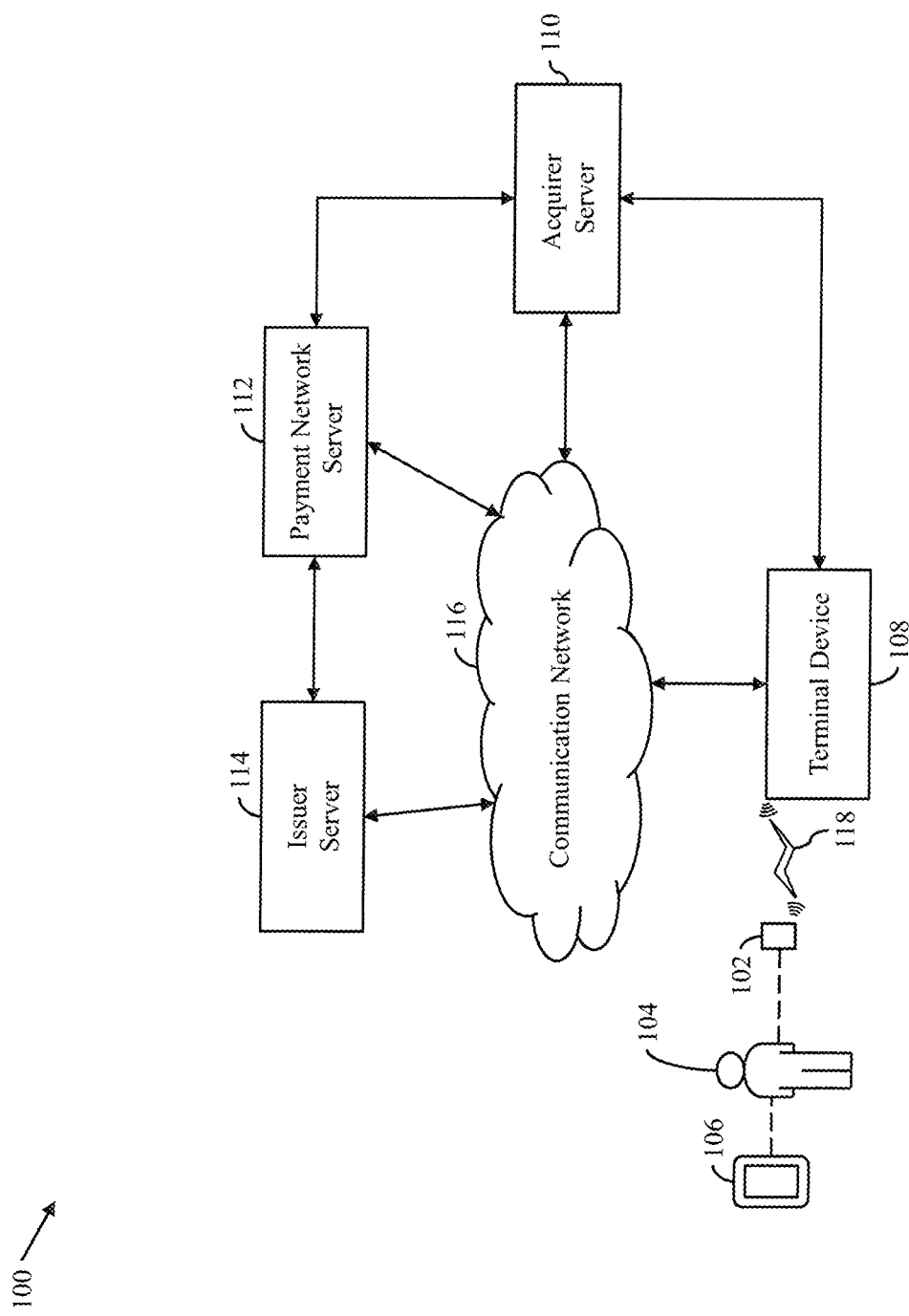
FIG. 1 is a block diagram that illustrates an exemplary environment for conducting transactions using an electronic chip, in accordance with an exemplary embodiment of the disclosure.

Further areas of applicability of the disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

In current transaction systems, when a user initiates a transaction at a terminal device, the user provides an authentication parameter to the terminal device for authentication. The terminal device communicates the authentication parameter to an issuer associated with the transaction for authenticating the user. The involvement of the issuer in carrying out the authentication process for various transactions not only increases a processing overhead of the issuer but also increases the processing time for the transactions. Although contactless transaction cards have the provision of offline authentication that reduces the processing overhead of the issuer and the processing time for the transactions, the contactless transaction cards are susceptible to skimming frauds.

Various embodiments of the disclosure provide a method and a system to solve the abovementioned problems by allowing transactions to be conducted using an electronic chip. An electronic chip issuer (for example an issuer server or a third-party server) issues the electronic chip to a user for enabling the user to conduct transactions at a terminal device. Examples of the terminal device may include an automatic teller machine (ATM), a bunch note acceptor (BNA), a currency recycler, a point-of-purchase (POP) device, a point-of-interaction (POI) device, a point-of-sale (POS) device, or the like. In one example, the electronic chip is placed on or attached to a wearable device of the user. In another example, the electronic chip is placed under or attached to an epidermis layer of skin of the user. The user adds payment modes to the electronic chip by electronically storing the details of the payment modes in the electronic chip. Examples of the payment modes may include transaction cards and/or digital wallets. The user further stores one or more sample authentication parameters (e.g., a fingerprint, a retina scan, a faceprint, a voiceprint, or the like) of the user in the electronic chip. When the user wants to conduct a transaction at the terminal device using the electronic chip, the user selects a chip-based transaction option displayed on a graphical interface of the terminal device. The user provides a first authentication parameter to the terminal device. Examples of the first authentication parameters include, a fingerprint, a retina scan, a faceprint, a voiceprint, or the like. The terminal device communicates an authentication request including the first authentication parameter to the electronic chip. The electronic chip authenticates the user by comparing the first authentication parameter with the sample authentication parameters stored in the electronic chip. Based on a match between the first authentication parameter and one of the sample authentication parameters, the electronic chip generates an authentication response. The authentication response indicates whether the authentication of the user was successful. When the authentication is successful, the authentication response includes details of one or more payment modes of the plurality of payment modes that are added to the electronic chip. The terminal device further displays the one or more payment modes on the graphical interface to the user for selection. Based on a selection of a payment mode by the user, the terminal device generates an authorization request for authorization of the transaction and communicates the authorization request to an issuer of the selected payment mode. The authorization request includes details of the selected payment mode and transaction details of the transaction. The user may be allowed to select more than one payment modes from the displayed payment modes for conducting a split transaction (i.e., splitting a transaction amount of the transaction across multiple payment modes). The issuer authorizes the transaction based on the authorization request.

Thus, the user is authenticated offline without the involvement of the issuer, which reduces the processing overhead of the issuer and the processing time of the transaction. Since the electronic chip is either placed on the user's wearable device or placed under the user's skin, likelihood of skimming fraud is reduced. In addition, details stored in the electronic chip may only be retrieved by way of an authentication parameter of the user that matches one of the sample authentication parameters stored in the electronic chip, thus making the electronic chip immune to skimming fraud.

Terms Description (in Addition to Plain and Dictionary Meaning)

Transaction is an exchange of funds between two or more parties. For example, the transaction may include transferring a transaction amount from a user to a merchant, when the user makes a purchase from the merchant. In another example, the transaction may include dispensing cash, at an ATM, equivalent to a transaction amount debited from an account of the user based on a request from the user.

Payment mode is means of payment, such as a debit card, a credit card, a prepaid card, a gift card, a promotional card, a contactless card, a digital wallet, and/or like, that is linked to an account and holds identification information of the account. The payment mode may be used to perform transactions, such as deposits and cash-withdrawals, credit transfers, purchase payments, or the like, from the account to which it is linked. The payment mode may be a physical payment mode or a virtual payment mode that is electronically stored in a user device.

Terminal device is a computing device affiliated with a financial institution, (hereinafter "acquirer"). The terminal device enables users to perform various electronic transactions, such as cash withdrawals, cash deposits, purchase payments, funds transfer, or the like. Examples of the terminal device include, but are not limited to, a POS device, a POP device, a POI device, an ATM, a BNA, a currency recycler, or the like.

Acquirer is a financial institution where accounts of several merchants are established and maintained. The acquirer is further associated with a terminal device. The acquirer communicates an authorization request for a transaction initiated at the terminal device to a payment network.

Authorization request for a transaction refers to a request by which an acquirer ensures that the transaction is valid and authorized by a corresponding issuer. The acquirer communicates the authorization request to the issuer for authorization. The authorization request is pursuant to one or more standards for the interchange of transaction messages, such as the ISO8583 standard, and includes various fields, such as data elements (DEs), for storing transaction details of the transaction.

An electronic chip is a near field communication (NFC) enabled microchip that allows a user to conduct transactions at terminal devices. The electronic chip may be a microchip (for example, radio frequency identification tag, RFID tag) embedded in a wearable device of the user or may be a microchip implant that is placed under or attached to an epidermis layer of the skin of the user. The electronic chip may include a memory element for storing information such as details of various payment modes (e.g., details of a transaction card or a digital wallet) of a user and various authentication parameters (e.g., a fingerprint, a faceprint, a voiceprint, or a retina scan) of the user. The electronic chip is capable of communicating with other NFC enabled devices to transmit or receive information. For example, the electronic chip communicates with an NFC enabled terminal device for authenticating the user who has initiated a transaction.

A bi-directional communication link is a short-range wireless link established between two NFC enabled devices. For example, an electronic chip and a terminal device may communicate with each other by way of a bi-directional communication link established therebetween.

Authentication parameter refers to means of authenticating a user for a transaction. Examples of the authentication parameter may include a fingerprint, a faceprint, a voiceprint, a retina scan, a specific gesture, or the like. A first authentication parameter provided by the user is compared with a second authentication parameter stored in an electronic chip. When the first and second authentication parameter match, authentication is determined to be successful.

FIG. 1 is a block diagram that illustrates an exemplary environment 100 for conducting transactions using an electronic chip 102, in accordance with an exemplary embodiment of the disclosure. The environment 100 includes a user 104 associated with the electronic chip 102, a user device 106 of the user 104, a terminal device 108, an acquirer server 110, a payment network server 112, and an issuer server 114. The user device 106, the terminal device 108, the acquirer server 110, the payment network server 112, and the issuer server 114 communicate with each other by way of a communication network 116 or through separate communication networks established therebetween. The electronic chip 102 and the terminal device 108 communicate with each other by way of a bi-directional communication link 118 established therebetween.

Figure 2B:
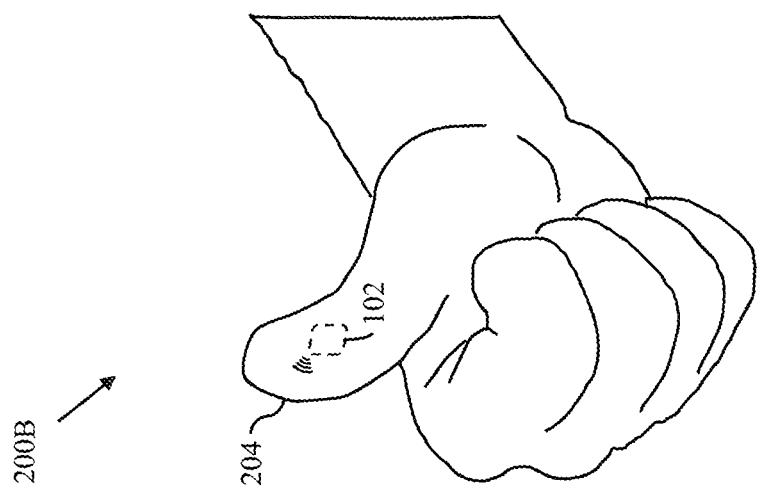
FIGS. 2A and 2B represent exemplary scenarios for placement of the electronic chip of FIG. 1, in accordance with an exemplary embodiment of the disclosure.
Figure 2A:
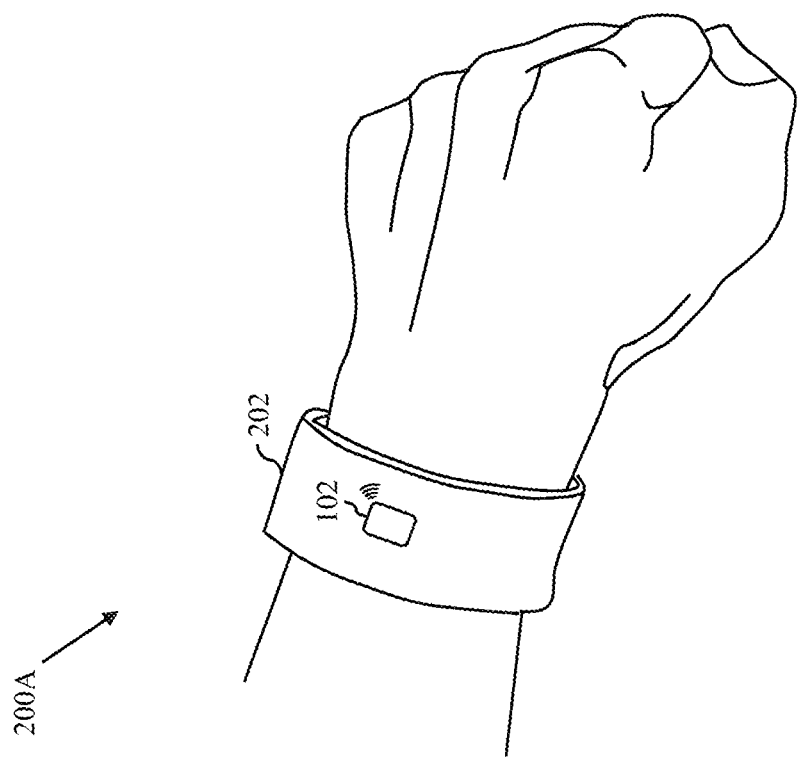

The electronic chip 102 is issued to the user 104 by an electronic chip issuer. In one example, the electronic chip issuer may be a financial institution where a user account of the user 104 is maintained. In another example, the electronic chip issuer may be a third-party service provider who is in partnership with various financial institutions. The electronic chip 102 includes suitable logic, circuitry, interfaces, and/or code, executed by the circuitry, for enabling the user 104 to conduct transactions. The electronic chip 102 is a near field communication (NFC) enabled microchip. NFC is a short-range wireless communication standard which enables communication between various devices (e.g., the electronic chip 102 and the terminal device 108 or the electronic chip 102 and the user device 106) when the devices are within a first distance (i.e., a pre-determined distance) from each other. The first distance refers to a communication range for an NFC enabled device (e.g., the electronic chip 102) to communicate with other NFC enabled devices (e.g., the user device 106 and the terminal device 108). For example, if the first distance is 10 centimetres (cms), the electronic chip 102 and the terminal device 108 should be within a range of 10 cms from each other for communication. In one embodiment, the electronic chip 102 may be a microchip (for example, an RFID tag, or the like) embedded in a wearable device of the user 104 (as shown in FIG. 2A). In another embodiment, the electronic chip 102 may be a microchip implant (for example, an RFID tag, or the like) that is placed under or attached to an epidermis layer of the skin of the user 104 (as shown in FIG. 2B).

In one embodiment, the electronic chip 102 may be initially inactive when issued to the user 104, and the electronic chip issuer may provide an activation key to the user 104 for activating the electronic chip 102. The electronic chip 102 is activated by the user 104 using a service application running on the user device 106. The service application may serve as an interface for the user 104 to communicate with the electronic chip 102. In one example, the user 104 uses the service application running on the user device 106 as an entry point to provide the activation key to the electronic chip 102. On receiving the activation key, the electronic chip 102 is activated for use.

After the electronic chip 102 is activated, the electronic chip 102 receives one or more sample authentication parameters of the user 104 from the user device 106. The user 104 may provide the sample authentication parameters to the electronic chip 102 by way of the service application running on the user device 106. The sample authentication parameters may include one or more fingerprints of the user 104, a faceprint of the user 104, a voiceprint of the user 104, a retina scan of the user 104, a specific gesture, or the like. The electronic chip 102 further receives details of various payment modes of the user 104 from the user device 106 by way of the service application. Examples of the payment modes may include transaction cards or digital wallets. For example, details of a transaction card may include a unique card number, an expiry date, a card security code, and a card type of the transaction card. Details of a digital wallet may include a wallet ID, a wallet number, or the like, of the digital wallet. The electronic chip 102 stores the sample authentication parameters and the details of the payment modes therein in an encrypted format. After the electronic chip 102 is activated, and the sample authentication parameters and the details of the payment modes are stored in the electronic chip 102, the electronic chip 102 may be utilized by the user 104 for conducting transactions at the terminal device 108. It will be apparent to a person of ordinary skill in the art that a plurality of electronic chips similar to the electronic chip 102 may be issued to a plurality of other users for conducting transactions at the terminal device 108 or any other terminal device.

The user device 106 is a communication device of the user 104. The user device 106 may serve as an interface for the user 104 to store information (e.g., the sample authentication parameters and the details of the payment modes) in the electronic chip 102 and update the stored information. The user device 106 may have the service application running thereon that allows the user 104 to store the information in the electronic chip 102 and update the stored information. The user device 106 may be utilized by the user 104 to communicate the activation key to the electronic chip 102 for activating the electronic chip 102. Examples of the user device 106 may include a smartphone, a personal computer, a tablet, a phablet, or the like.

The terminal device 108 includes suitable logic, circuitry, interfaces, and/or code, executed by the circuitry, to allow users (such as the user 104) to perform transactions from corresponding user accounts. The terminal device 108 may be associated with a financial institution, such as an acquirer. Examples of the terminal device 108 may include an ATM, a BNA, a currency recycler, a POP device, a POI device, a POS device, or the like. The terminal device 108 presents a chip-based transaction option for enabling the user 104 to conduct transactions using the electronic chip 102. The terminal device 108 is an NFC enabled device that is configured to detect the presence of the electronic chip 102 when the electronic chip 102 is within a communication range (for example, the first distance) of the terminal device 108. The terminal device 108 is further configured to establish the bi-directional communication link 118 between the terminal device 108 and the electronic chip 102 when the electronic chip 102 is detected within the communication range of the terminal device 108. The terminal device 108 communicates with the electronic chip 102 by way of the bi-directional communication link 118 and enables the user 104 to conduct transactions using the electronic chip 102. The terminal device 108 communicates with the electronic chip 102 for authenticating the user 104 for a transaction and receiving the details of the payment modes stored in the electronic chip 102 for processing the transaction.

The acquirer server 110 is a computing server that is operated by the acquirer and includes suitable logic, circuitry, interfaces, and/or code, executed by the circuitry, for processing the transactions. The acquirer server 110 may receive various authorization requests for transactions from the terminal device 108 and communicate the authorization requests to the payment network server 112 for further processing of the transactions.

The payment network server 112 is a computing server that is operated by a payment network and includes suitable logic, circuitry, interfaces, and/or code, executed by the circuitry, for processing the transactions. The payment network server 112 represents an intermediate entity between the acquirer server 110 and the issuer server 114 for authorizing and funding the transactions. The payment network server 112 may receive the authorization requests from the acquirer server 110 and communicate the authorization requests to the issuer server 114.

The issuer server 114 is a computing server that is operated by the issuer and includes suitable logic, circuitry, interfaces, and/or code, executed by the circuitry, for processing transactions. The issuer is a financial institution that manages accounts of multiple users, such as the user 104. Account details of the user accounts established with the issuer are stored as account profiles in a memory (not shown) of the issuer server 114 or on a cloud server associated with the issuer server 114. The account details may include an account balance, an available credit line, details of an account holder, transaction history of the account holder, account information, or the like. The details of the account holder may include name, age, gender, physical attributes, registered contact number, alternate contact number, registered e-mail ID, or the like of the account holder.

In one embodiment, when the issuer associated with the issuer server 114 is the electronic chip issuer, the issuer server 114 may store an electronic chip identifier (ID) of the electronic chip 102 in a database. The issuer server 114 may further host the service application that is executable on the user device 106 and communicate the activation key to the user device 106 by way of the service application. The issuer server 114 may further store, in the database, an activation status of the electronic chip 102 indicating whether the electronic chip 102 has been activated using the activation key.

The issuer server 114 receives the authorization requests for the transactions from the payment network server 112. The issuer server 114 authorizes the transactions based on the authorization requests and generates authorization responses indicating whether the transactions are approved or declined. Methods for processing transactions via the issuer server 114 will be apparent to a person of ordinary skill in the art and may include processing the transaction via the traditional four-party system or the traditional three-party system. Though the issuer server 114 and the acquirer server 110 are shown as separate entities in FIG. 1, in other embodiments, where the issuer and acquirer are same, the operations performed by the issuer server 114 and the acquirer server 110 may be performed by a single entity without deviating from the scope of the disclosure. In such a scenario, the electronic chip 102 and the terminal device 108 may be associated with the same entity.

The communication network 116 is a medium through which content and messages are transmitted between the terminal device 108, the acquirer server 110, the payment network server 112, the issuer server 114, or other entities that are pursuant to one or more standards for the interchange of transaction messages, such as the ISO8583 standard. Examples of the communication network 116 include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 116 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the electronic chip 102 is issued to the user 104 by the electronic chip issuer (for example, the issuer server 114). The electronic chip 102 may either be embedded in the wearable device of the user 104 or placed under (or attached on) the skin of the user 104. The user device 106 is utilized by the user 104 for activating the electronic chip 102, and storing the sample authentication parameters and the details of the payment modes in the electronic chip 102. After the sample authentication parameters and the details of the payment modes are stored, the electronic chip 102 is utilized by the user 104 for conducting a transaction at the terminal device 108. The user 104 selects the chip-based transaction option presented at the terminal device 108 for conducting the transaction using the electronic chip 102.

Based on the selection of the chip-based transaction option, the terminal device 108 detects the presence of any electronic chip within the first distance. When the electronic chip 102 is determined to be present within the first distance from the terminal device 108, the terminal device 108 establishes the bi-directional communication link 118 with the electronic chip 102. The terminal device 108 further prompts the user 104 to provide a first authentication parameter (e.g., a fingerprint, a faceprint, a voiceprint, or a retina scan of the user 104 and/or a specific gesture). Based on the first authentication parameter of the user 104, the terminal device 108 generates an authentication request including the first authentication parameter, and communicates the authentication request to the electronic chip 102 by way of the bi-directional communication link 118.

The electronic chip 102 receives the authentication request and compares the first authentication parameter with the sample authentication parameters stored in the electronic chip 102. Based on the comparison between the first authentication parameter and the sample authentication parameters, the electronic chip 102 generates an authentication response. When the first authentication parameter matches any of the sample authentication parameters, the authentication is successful and the authentication response includes the details of the payment mode/s that are stored in the electronic chip 102. The electronic chip 102 communicates the authentication response to the terminal device 108 by way of the bi-directional communication link 118. Based on the received authentication response, the terminal device 108 renders a graphical interface to display the payment mode/s to the user 104. One or more of the displayed payment modes are selected by the user 104 for carrying out the transaction. Based on the selection of the payment mode/s, the terminal device 108 generates an authorization request for authorizing the transaction. The terminal device 108 communicates the authorization request to the acquirer server 110. The method for authorizing and processing the transaction will be apparent to a person of ordinary skill in the art and may include processing the transaction via the traditional four-party system or the traditional three-party system.

FIG. 2A represents a first exemplary scenario 200A for placement of the electronic chip 102, in accordance with an exemplary embodiment of the disclosure. As shown in FIG. 2A, the electronic chip 102 is embedded in a wearable device 202. The wearable device 202 is shown to be a wrist-band worn by the user 104. In other embodiments, the wearable device 202 may be a watch, an arm band, a pair of glasses, a ring, a cap, or any other device that is capable of being integrated with the electronic chip 102.

FIG. 2B represents a second exemplary scenario 200B for placement of the electronic chip 102, in accordance with another embodiment of the disclosure. As shown in FIG. 2B, the electronic chip 102 is placed under or attached to the skin of a thumb 204 of the user 104. For example, the electronic chip 102 may be implanted under the skin of the thumb 204. In other embodiments, the electronic chip 102 may be placed under or attached to the skin of any other body part of the user 104 based on a consent of the user 104, without deviating from the scope of the disclosure.

Figure 3:
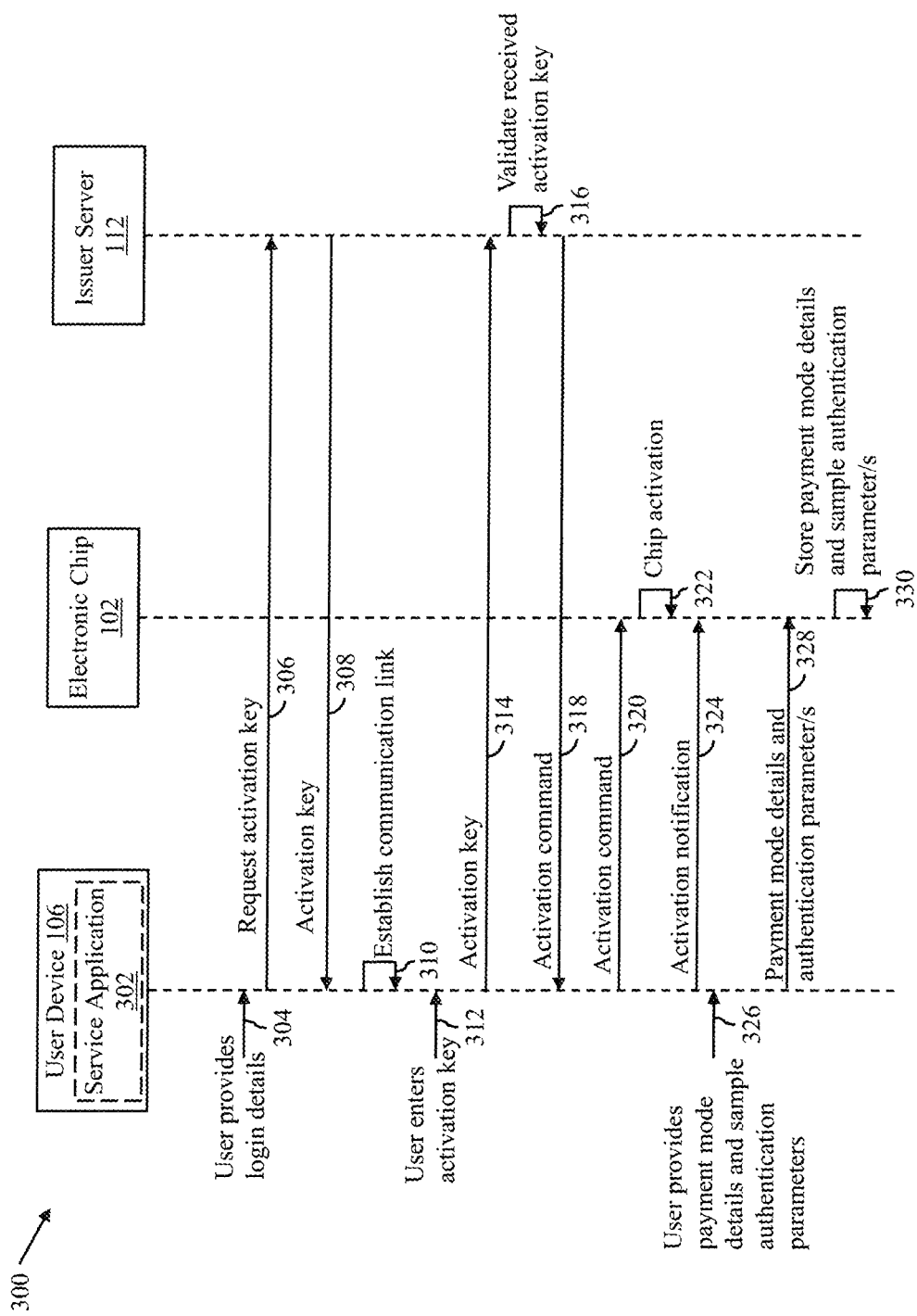
FIG. 3 is a process flow diagram that illustrates an exemplary scenario for activating and storing details in the electronic chip of FIG. 1, in accordance with an exemplary embodiment of the disclosure.

FIG. 3 is a process flow diagram 300 that illustrates an exemplary scenario for activating and storing details in the electronic chip 102, in accordance with an exemplary embodiment of the disclosure.

The user 104 utilizes the user device 106 to log into a service application 302 hosted by the issuer server 114. The user 104 may log into the service application 302 by providing login details, such as a username and a password, of the user 104 (as shown by arrow 304). The user 104 utilizes the service application 302 for requesting the issuer server 114 to provide an activation key for activating the electronic chip 102. The user device 106 communicates the request for the activation key to the issuer server 114 (as shown by arrow 306). The request may include the electronic chip ID of the electronic chip 102. The issuer server 114 receives the request from the user device 106 and communicates the activation key associated with the electronic chip 102 to the user device 106 (as shown by arrow 308). For example, based on the received request, the issuer server 114 dynamically generates the activation key for the electronic chip 102, and stores the activation key in the database. After storing the activation key, the issuer server 114 transmits a message, indicating the activation key, to the user device 106. The message may be in the form of an electronic mail (e-mail), a short message service (SMS), an interactive voice response (IVR) call, or the like. The user 104 further utilizes the user device 106 to establish a communication link (i.e., similar to the bi-directional communication link 118) between the electronic chip 102 and the user device 106 (as shown by arrow 310).

When the communication link between the electronic chip 102 and the user device 106 is established, the user 104 enters the activation key through the service application 302 (as shown by arrow 312). The user device 106 communicates the activation key and the electronic chip ID of the electronic chip 102 to the issuer server 114 for validation (as shown by arrow 314). The issuer server 114 then validates the activation key received from the user device 106 (as shown by arrow 316). For validating the received activation key, the issuer server 114 refers to the database including all the activation keys generated by the issuer server 114 and retrieves the activation key that corresponds to the electronic chip 102. The issuer server 114 then compares the activation key retrieved from the database and the activation key received from the user device 106. In a scenario, where both the activation keys match, the issuer server 114 determines that the activation key received from the user device 106 is valid.

The issuer server 114 communicates an activation command to the user device 106 when the activation key received from the user device 106 is determined to be valid (as shown by arrow 318). The user device 106 communicates the activation command to the electronic chip 102 for activating the electronic chip 102 (as shown by arrow 320). Based on the activation command, the electronic chip 102 is activated (as shown by arrow 322). The electronic chip 102 communicates an activation notification to the user device 106 (as shown by arrow 324). When the user device 106 receives the activation notification indicating successful activation of the electronic chip 102, the service application 302 allows the user 104 to add to the electronic chip 102, various payment modes of the user 104 or payment modes of other users from which the user 104 is authorized to perform transactions. The payment modes may correspond to transaction cards and/or digital wallets. The payment modes may be associated with different issuers and different payment networks. The user 104 is required to provide the details of the payment modes to the electronic chip 102 for adding the payment modes to the electronic chip 102. The user 104 is further required to provide one or more sample authentication parameters for each payment mode.

The user 104 may utilize the user device 106 for providing the sample authentication parameters and the details of the payment modes (as shown by arrow 326). In one embodiment, the user 104 may provide different sample authentication parameters for different payment modes. In another embodiment, the user 104 may provide one or more sample authentication parameters that are applicable for all the payment modes that the user 104 wants to add to the electronic chip 102. The sample authentication parameters may include the fingerprints, the faceprint, the voiceprint, the retina scan of the user 104 and/or a specific gesture. In one example, when one of the sample authentication parameters is a fingerprint, the user 104 may provide the fingerprint by using a fingerprint scanner on the user device 106. In another example, when one of the sample authentication parameters is a faceprint, a camera of the user device 106 may be utilized to scan the faceprint of the user 104. Likewise, the camera may be utilized to scan the retina or the specific gesture of the user 104. The user device 106 communicates the sample authentication parameters and the details of the payment modes provided by the user 104 to the electronic chip 102 (as shown by arrow 328). The electronic chip 102 then stores the sample authentication parameters and the details of the payment modes therein (as shown by arrow 330). In one embodiment, the electronic chip 102 may store the sample authentication parameters and the details of the payment modes in an encrypted format to ensure data security. Storing the details of the payment modes in the electronic chip 102 corresponds to adding the payment modes to the electronic chip 102. The electronic chip 102 further links the sample authentication parameters to the payment modes added to the electronic chip 102. In one example, a fingerprint of the user 104 is linked to a first transaction card that is added to the electronic chip 102 and the faceprint of the user 104 is linked to a first digital wallet that is added to the electronic chip 102. In another example, the fingerprint of the user 104 is linked to the first transaction card and the first digital wallet. In one embodiment, the user 104 may be allowed to designate one of the added payment modes as a default payment mode. In another embodiment, the electronic chip 102 may automatically designate one of the added payment modes as the default payment mode based on various selection parameters (as described in FIG. 4A).

In one embodiment, the activation key generated by the issuer server 114 may be associated with an expiry time. For example, the expiry time of the activation key may be 1 hour (i.e., the activation key, if not used, will expire after 1 hour). In such a scenario, if the user 104 uses an expired activation key for activating the electronic chip 102, the activation fails. After the lapse of the expiry time, the user 104 has to request the issuer server 114 for a new activation key.

In another embodiment, the activation key may be static and may be stored in the electronic chip 102 by the issuer server 114. In such a scenario, when the user device 106 receives the activation key from the issuer server 114 based on the request of the user 104, the user device 106 directly communicates the activation key to the electronic chip 102 for validation. The electronic chip 102 may compare the received activation key with the stored activation key. If the received activation key matches the stored activation key, the electronic chip 102 is activated. The electronic chip 102 may further communicate the activation notification to the user device 106. In one embodiment, the electronic chip 102 may be secured by way of a password. Thus, if the user 104 wants to update the information (e.g., the details of the payment modes and the sample authentication parameters) stored in the electronic chip 102, the user 104 is required to provide the password to the electronic chip 102 by accessing the service application 302 on the user device 106. When the password provided by the user 104 is correct, the user 104 is allowed to update the information stored in the electronic chip 102.

In one embodiment, the user 104 may be allowed to set various selection parameters (such as spending limits, allowed merchant categories, and/or the like) for the payment modes added to the electronic chip 102. In one example, the user 104 may set a spending limit for the first transaction card added to the electronic chip 102. In such a scenario, the user 104 may be restricted from spending more than the set (or assign) spending limit by using the first transaction card. In another example, the user 104 may set a merchant category, for example grocery stores, for the first transaction card. In such a scenario, the user 104 may be restricted from using the first transaction card at any other merchant except grocery stores.

In another embodiment, the details of the payment modes of the user 104 may be already stored in the electronic chip 102 by the issuer server 114 when the electronic chip 102 is issued to the user 104. In such a scenario, the user 104 only needs to activate the electronic chip 102 and store the sample authentication parameters in the electronic chip 102. Additional payment modes may be added to the electronic chip 102 by the user 104 as described in the foregoing description of FIG. 3.

Figure 4A:
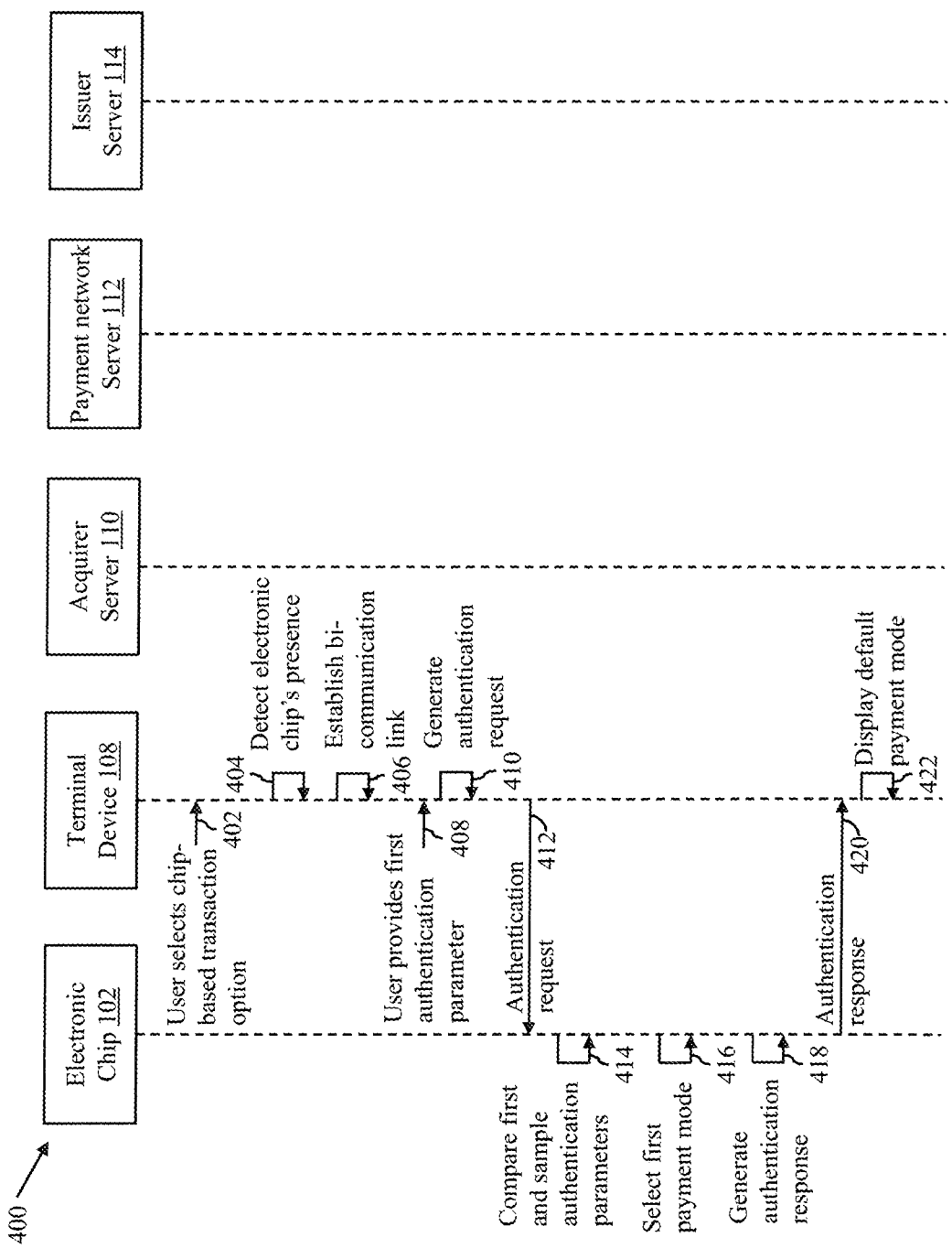
FIGS. 4A-4C, collectively represent a process flow diagram that illustrates an exemplary scenario for conducting transactions using the electronic chip of FIG. 1, in accordance with an exemplary embodiment of the disclosure.
Figure 4B:
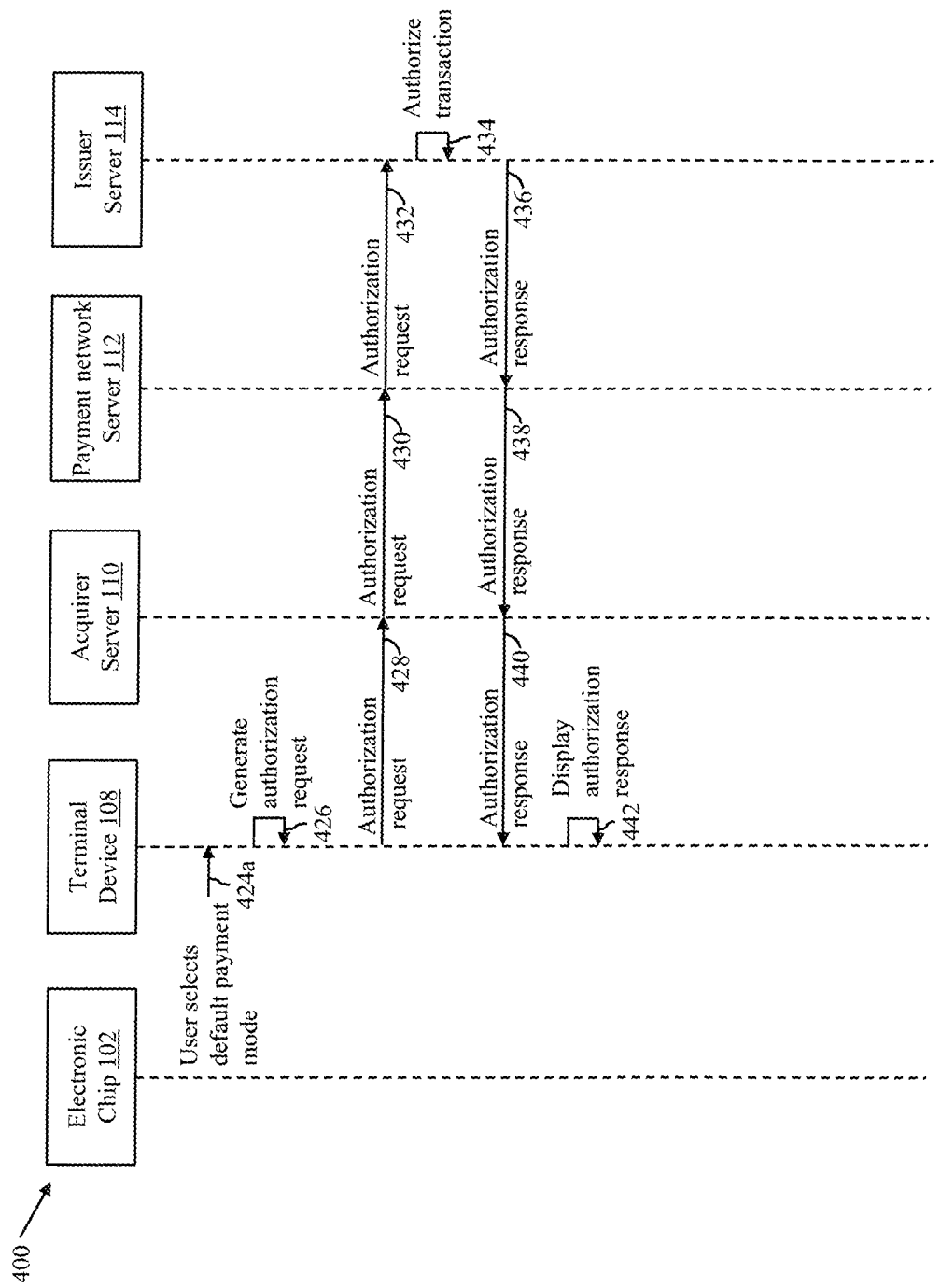
Figure 4C:
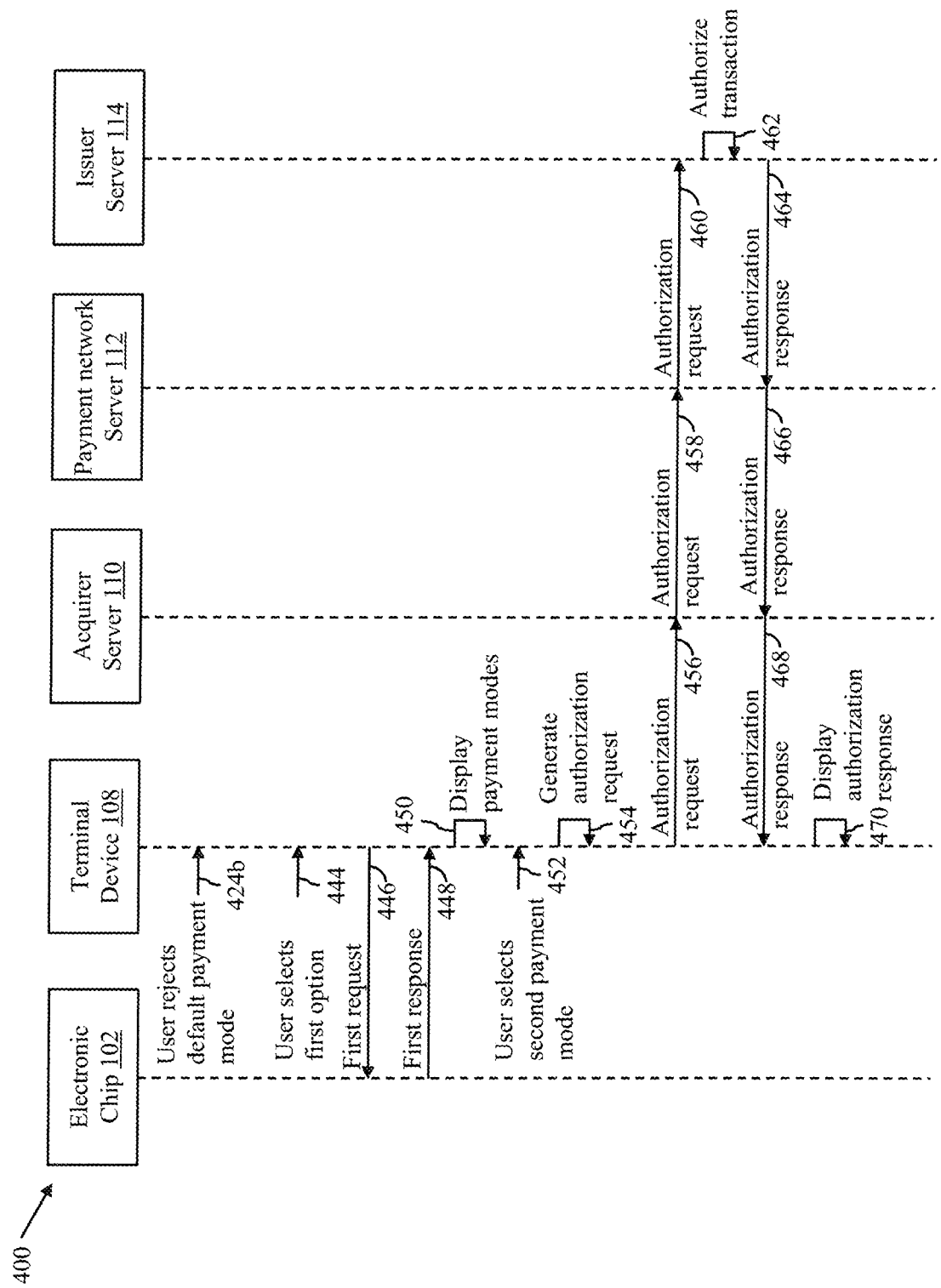

FIGS. 4A-4C, collectively represent a process flow diagram 400 that illustrates an exemplary scenario for conducting transactions using the electronic chip 102, in accordance with an exemplary embodiment of the disclosure. The user 104 may have activated and stored the details of the payment modes in the electronic chip 102. The user 104 may utilize the terminal device 108 for conducting a transaction using the electronic chip 102.

The terminal device 108 renders a graphical interface for presenting the chip-based transaction option and a card-based transaction option to the user 104. The chip-based transaction option allows the user 104 to conduct the transaction using the electronic chip 102. The card-based transaction option allows the user 104 to conduct the transaction using transaction cards. The user 104 initiates the transaction by selecting the chip-based transaction option (as shown by arrow 402). Based on the selection of the chip-based transaction option, the terminal device 108 detects whether there is any electronic chip present within the first distance from the terminal device 108. The first distance may refer to the communication range, for example 10 cms, of the terminal device 108. In a scenario where the terminal device 108 does not detect the presence of any electronic chip within the first distance, the terminal device 108 may notify the user 104 that no electronic chip is detected for the chip-based transaction. In one exemplary scenario, the terminal device 108 detects the presence of the electronic chip 102 within the first distance from the terminal device 108 (as shown by arrow 404).

The terminal device 108 then establishes the bi-directional communication link 118 between the terminal device 108 and the electronic chip 102 (as shown by arrow 406), and prompts the user 104 to provide an authentication parameter associated with the electronic chip 102. In one embodiment, the terminal device 108 may be configured to implement one or more authentication schemes that are known in the art for ensuring that the bi-directional communication link 118 is established with only genuine electronic chips. Examples of such authentication schemes may include static data authentication (SDA), dynamic data authentication (DDA), and/or combined DDA with application cryptogram generation.

Figure 7:
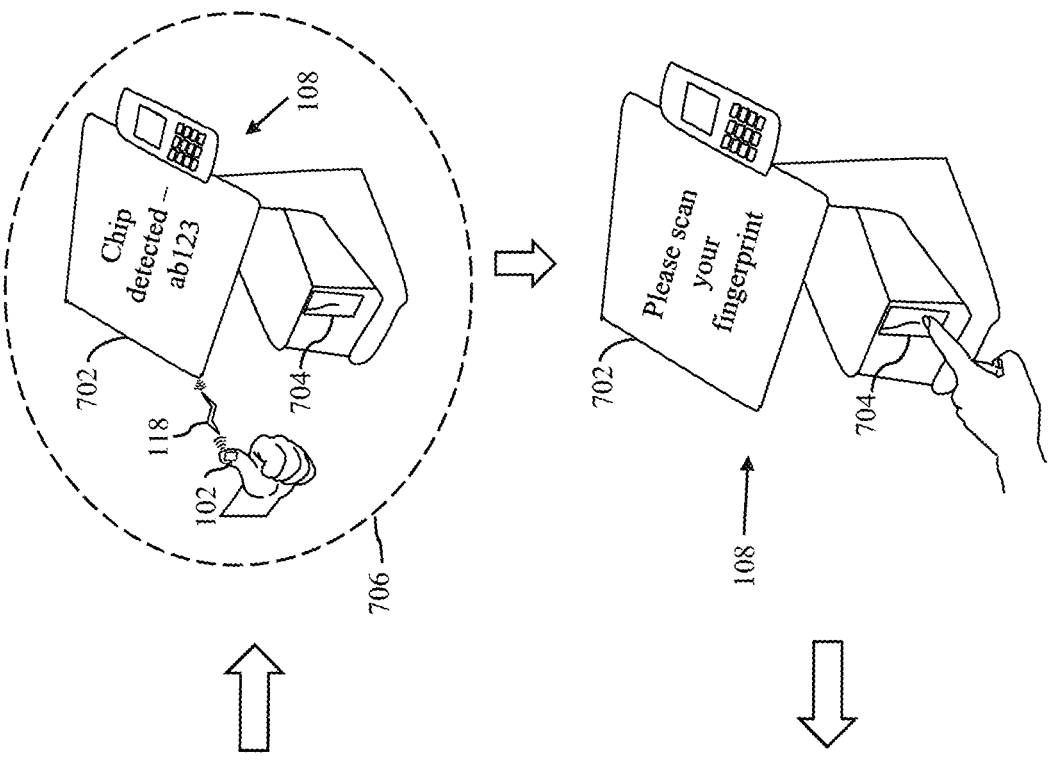
FIG. 7 represents an exemplary scenario for conducting a transaction using the electronic chip of FIG. 1 at the terminal device of FIG. 1, in accordance with an exemplary embodiment of the disclosure.
Figure 7:
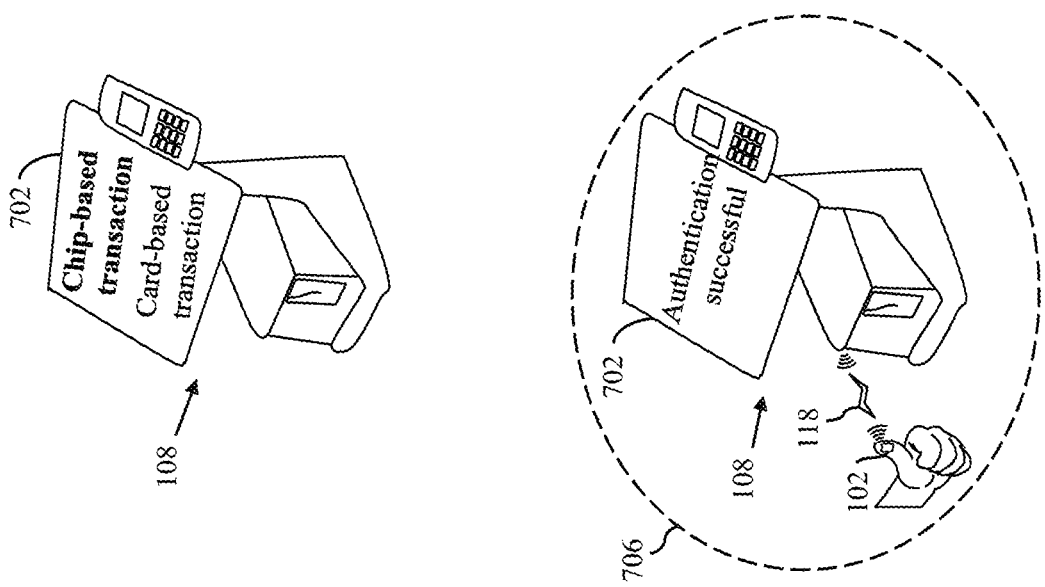

The user 104 provides the first authentication parameter to the terminal device 108 (as shown by arrow 408). In one example, the user 104 places a finger on a fingerprint scanner (as shown in FIG. 7) of the terminal device 108 for providing a fingerprint (i.e., the first authentication parameter) to the terminal device 108. In another example, a camera of the terminal device 108 scans the retina of the user 104 as the first authentication parameter. In another example, the camera of the terminal device 108 scans the faceprint of the user 104. In another example, the camera of the terminal device 108 records a gesture made by the user 104 as the first authentication parameter.

Based on the first authentication parameter of the user 104, the terminal device 108 generates an authentication request (as shown by arrow 410) and communicates the authentication request to the electronic chip 102 by way of the bi-directional communication link 118 (as shown by arrow 412). The authentication request includes the first authentication parameter of the user 104. The electronic chip 102 receives the authentication request and compares the first authentication parameter included in the authentication request with the sample authentication parameters stored therein (as shown by arrow 414). The electronic chip 102 determines that authentication is successful when the first authentication parameter matches any of the sample authentication parameters. The electronic chip 102 determines that authentication is unsuccessful when the first authentication parameter does not match any of the sample authentication parameters. In a scenario where the first authentication parameter does not match any of the sample authentication parameters, the electronic chip 102 may communicate a message to the terminal device 108 indicating that the authentication has failed. In such a scenario, the user 104 may reinitiate the transaction and provide another authentication parameter.

In a non-limiting example, it is assumed that the first authentication parameter matches a first sample authentication parameter. In such a scenario, the electronic chip 102 selects the default payment mode from the payment modes that are added to the electronic chip 102 (as shown by arrow 416). In one embodiment, the default payment mode is already set by the user 104. In another embodiment, the electronic chip 102 may automatically select the default payment mode based on one or more selection parameters, such as frequency of use of the payment modes, merchant categories, spending limit of the payment modes, or the like. For example, the electronic chip 102 may select a payment mode as the default payment mode that has a maximum frequency of use (i.e., a first selection parameter of the one or more selection parameters). In another example, the electronic chip 102 may determine that the user 104 has always used a first payment mode for purchases at grocery stores, and the current transaction is also for grocery purchase. In such a scenario, the electronic chip 102 may select the first payment mode as the default payment mode based on the merchant category (i.e., a second selection parameter of the one or more selection parameters). In another example, the electronic chip 102 may select the default payment mode based on the first authentication parameter of the user 104. When each payment mode added to the electronic chip 102 has a specific sample authentication parameter linked to it, the electronic chip 102 may select that payment mode as the default payment mode for which the sample authentication parameter matches the first authentication parameter (i.e., a third selection parameter of the one or more selection parameters).

Based on the selection of the default payment mode, the electronic chip 102 generates an authentication response (as shown by arrow 418). The authentication response includes the details of the default payment mode in an encrypted format. The electronic chip 102 communicates the authentication response to the terminal device 108 by way of the bi-directional communication link 118 (as shown by arrow 420). The terminal device 108 receives the authentication response from the electronic chip 102 and displays the details of the default payment mode on the graphical interface to the user 104 (as shown by arrow 422). In one example, when the default payment mode is a transaction card, the terminal device 108 may display last four digits of a transaction card number of the transaction card. In another example, when the default payment mode is a digital wallet, the terminal device 108 may display a wallet ID of the digital wallet. In another example, the terminal device 108 may display a username (for example, a unique identifier assigned to the payment mode) associated with the default payment mode. The terminal device 108 may prompt the user 104 to select the default payment mode for executing the transaction. In one embodiment, the terminal device 108 may further present a first option to the user 104 to reject the default payment mode and request for another payment mode from the electronic chip 102 to execute the transaction. An exemplary scenario where the user 104 selects the default payment mode for carrying out the transaction, is described in conjunction with FIG. 4B and another exemplary scenario where the user 104 rejects the default payment mode and chooses another payment mode that is different from the default payment mode for carrying out the transaction is described in conjunction with FIG. 4C.

With reference to FIG. 4B, it is assumed that the user 104 selects the default payment mode for the transaction (as shown by arrow 424a). Based on the selection of the default payment mode, the terminal device 108 generates an authorization request for authorizing the transaction (as shown by arrow 426). The authorization request includes the details of the default payment mode and transaction details of the transaction. The transaction details of the transaction may include a transaction amount of the transaction, a transaction time, a transaction date, an authentication indicator, the electronic chip ID of the electronic chip 102, or the like. The authentication indicator may indicate that the authentication is successful. In one example, the authorization request is pursuant to one or more standards for the interchange of transaction messages, such as the ISO8583 standard.

The terminal device 108 communicates the authorization request to the acquirer server 110 (as shown by arrow 428). The acquirer server 110 receives the authorization request from the terminal device 108 and identifies a payment network that corresponds to the transaction, as known by those skilled in the art. The acquirer server 110 communicates the authorization request to the payment network server 112 of the identified payment network (as shown by arrow 430). The payment network server 112 receives the authorization request and identifies the issuer that corresponds to the transaction, as known by those skilled in the art. Once the issuer is identified, the payment network server 112 communicates the authorization request to the issuer server 114 of the identified issuer (as shown by arrow 432). The issuer server 114 verifies the details of the default payment mode and processes the transaction based on the successful verification of the default payment mode. The issuer server 114 generates an authorization response indicating the approval of the transaction (as shown by arrow 434). The issuer server 114 further communicates the authorization response to the payment network server 112 (as shown by arrow 436). The payment network server 112 receives the authorization response and communicates the received authorization response to the acquirer server 110 (as shown by arrow 438). The acquirer server 110 communicates the authorization response to the terminal device 108 (as shown by arrow 440). By way of the authorization response, the terminal device 108 is notified whether the transaction has been approved or declined by the issuer server 114. The terminal device 108 displays on the rendered graphical interface, a message to indicate whether the transaction is approved or declined (as shown by arrow 442). When the transaction is approved, the transaction amount of the transaction is charged to the default payment mode of the user 104. In a scenario where the terminal device 108 is an ATM, cash equivalent to the transaction amount is dispensed at the terminal device 108 when the transaction is approved.

With reference to FIG. 4C, it is assumed that the user 104 rejects the default payment mode (as shown by arrow 424b) and selects the first option requesting the terminal device 108 to retrieve details of remaining payment modes from the electronic chip 102 (as shown by arrow 444). Based on the selection of the first option, the terminal device 108 communicates a first request to the electronic chip 102 by way of the bi-directional communication link 118 for retrieving the details of the remaining payment modes (as shown by arrow 446). The electronic chip 102 receives the first request and communicates a first response including the encrypted details of the remaining payment modes to the terminal device 108 (as shown by arrow 448).

The terminal device 108 receives the first response and displays the details of the remaining payment modes on the graphical interface for selection (as shown by arrow 450). In one example, the user 104 may select a second payment mode from the remaining payment modes for carrying out the transaction (as shown by arrow 452). Based on the selection of the second payment mode, the terminal device 108 generates the authorization request (as shown by arrow 454). The authorization request includes the details of the second payment mode and the transaction details of the transaction.

The terminal device 108 communicates the authorization request to the acquirer server 110 (as shown by arrow 456). The acquirer server 110 receives the authorization request from the terminal device 108 and identifies a payment network that corresponds to the transaction, as known by those skilled in the art. The acquirer server 110 communicates the authorization request to the payment network server 112 of the identified payment network (as shown by arrow 458). The payment network server 112 receives the authorization request and identifies the issuer that corresponds to the transaction, as known by those skilled in the art. Once the issuer is identified, the payment network server 112 communicates the authorization request to the issuer server 114 of the identified issuer (as shown by arrow 460). The issuer server 114 verifies the details of the second payment mode and processes the transaction based on the second payment mode. The issuer server 114 generates the authorization response indicating the approval of the transaction (as shown by arrow 462). The issuer server 114 further communicates the authorization response to the payment network server 112 (as shown by arrow 464). The payment network server 112 receives the authorization response and communicates the received authorization response to the acquirer server 110 (as shown by arrow 466). The acquirer server 110 communicates the authorization response to the terminal device 108 (as shown by arrow 468). The terminal device 108 displays on the rendered graphical interface, a message to indicate whether the transaction is approved or declined (as shown by arrow 470). When the transaction is approved, the transaction amount of the transaction is charged to the second payment mode. In a scenario where the terminal device 108 is an ATM, cash equivalent to the transaction amount is dispensed at the terminal device 108 when the transaction is approved.

Figure 5A:
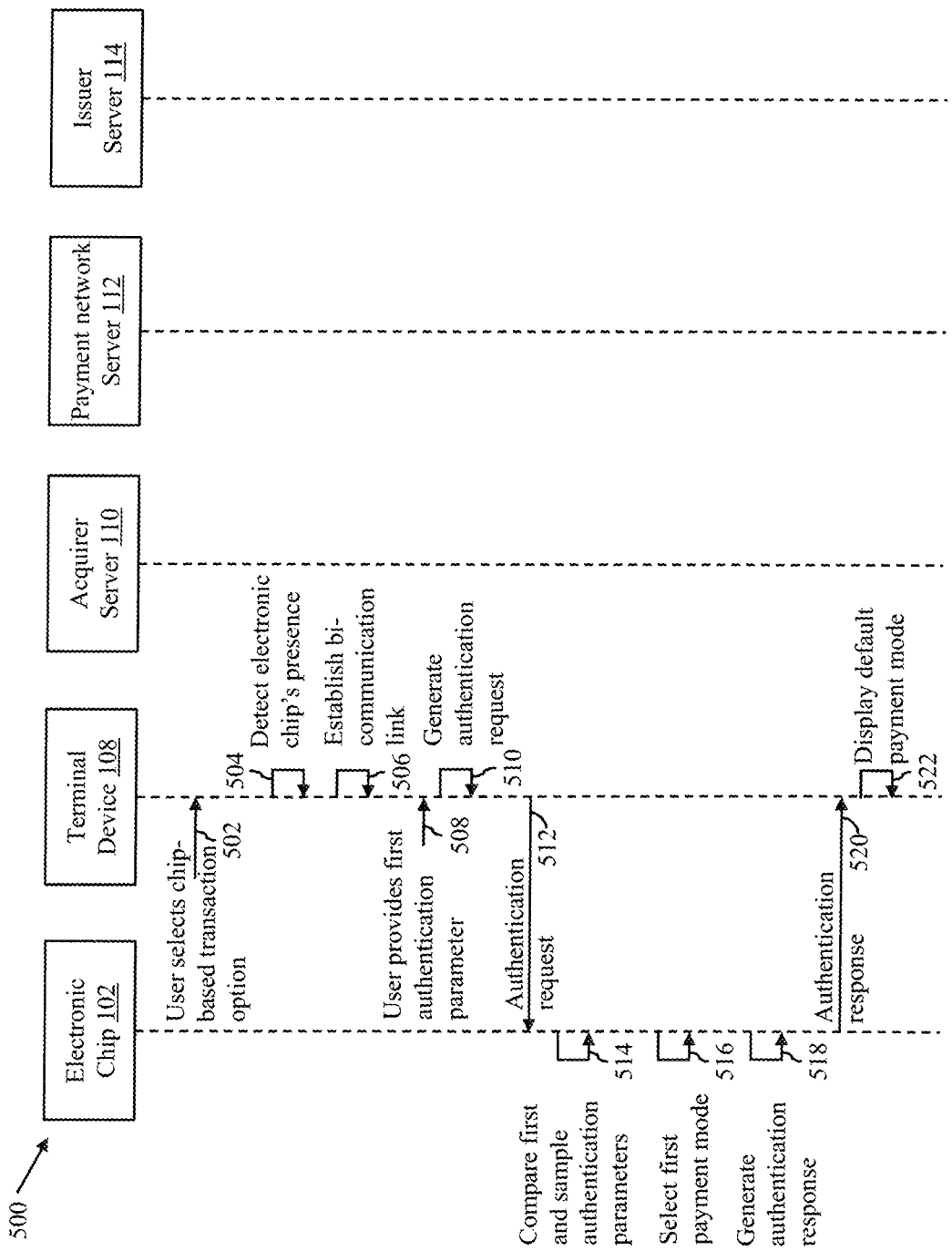
FIGS. 5A and 5B, collectively represent a process flow diagram that illustrates an exemplary scenario for conducting a split transaction using the electronic chip of FIG. 1, in accordance with an exemplary embodiment of the disclosure.
Figure 5B:
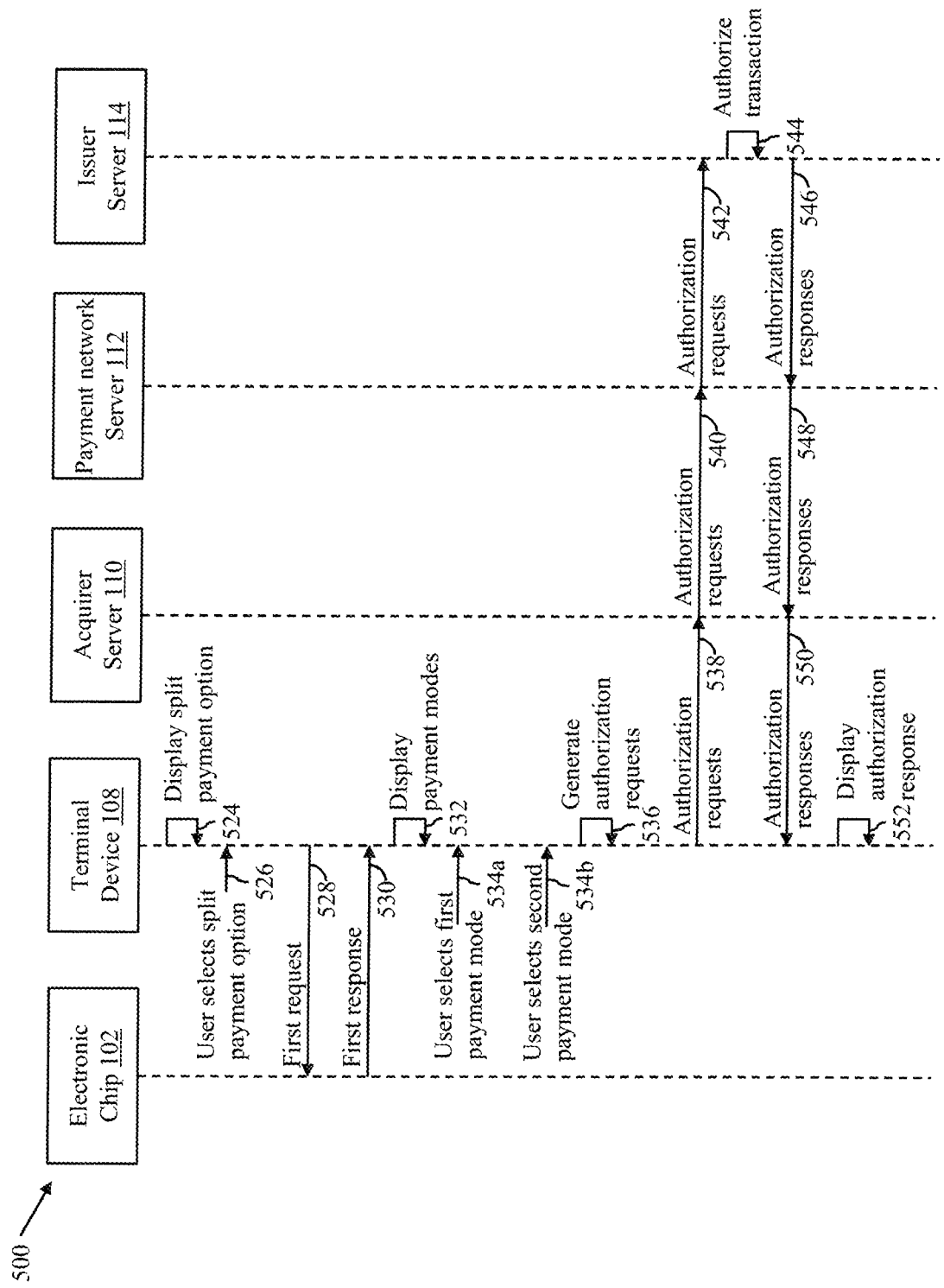

FIGS. 5A and 5B, collectively represent a process flow diagram 500 that illustrates an exemplary scenario for conducting a split transaction using the electronic chip 102, in accordance with an exemplary embodiment of the disclosure. The user 104 may have activated and stored the details of the payment modes in the electronic chip 102. The user 104 may utilize the terminal device 108 for conducting the split transaction (i.e., a transaction for which a transaction amount is split across multiple payment modes) using the electronic chip 102.

The terminal device 108 renders the graphical interface for presenting the chip-based transaction option and the card-based transaction option to the user 104. The user 104 initiates the transaction by selecting the chip-based transaction option (as shown by arrow 502). Based on the selection of the chip-based transaction option, the terminal device 108 detects whether there is any electronic chip present within the first distance from the terminal device 108. In one exemplary scenario, the terminal device 108 detects the presence of the electronic chip 102 within the first distance from the terminal device 108 (as shown by arrow 504). The terminal device 108 then establishes the bi-directional communication link 118 between the terminal device 108 and the electronic chip 102 (as shown by arrow 506), and prompts the user 104 to provide an authentication parameter associated with the electronic chip 102.

The user 104 provides the first authentication parameter to the terminal device 108 (as shown by arrow 508). Based on the first authentication parameter of the user 104, the terminal device 108 generates an authentication request (as shown by arrow 510) and communicates the authentication request to the electronic chip 102 by way of the bi-directional communication link 118 (as shown by arrow 512). The authentication request includes the first authentication parameter of the user 104. The electronic chip 102 receives the authentication request and compares the first authentication parameter included in the authentication request with the sample authentication parameters stored therein (as shown by arrow 514).

In a non-limiting example, it is assumed that the first authentication parameter matches one of the sample authentication parameters. In such a scenario, the electronic chip 102 selects the default payment mode from the payment modes stored therein (as shown by arrow 516). The selection of the default payment mode has been described in the foregoing description of FIG. 4A. Based on the selection of the default payment mode, the electronic chip 102 generates an authentication response (as shown by arrow 518). The authentication response includes the details of the default payment mode. The electronic chip 102 communicates the authentication response to the terminal device 108 by way of the bi-directional communication link 118 (as shown by arrow 520). The terminal device 108 receives the authentication response from the electronic chip 102 and displays the details of the default payment mode on the graphical interface to the user 104 (as shown by arrow 522).

With reference to FIG. 5B, the terminal device 108 displays a split payment option in addition to the first option (as described in FIG. 4A) on the graphical interface (as shown by arrow 524). The split payment option allows the user 104 to split the transaction amount of the transaction across multiple payment modes. For example, the transaction amount of the transaction may be $2,000 and the user 104 may want to split $2,000 across two payment modes. In such a scenario, the user 104 selects the split payment option (as shown by arrow 526). Based on the selection of the split payment option, the terminal device 108 communicates the first request to the electronic chip 102 for obtaining the details of the remaining payment modes (as shown by arrow 528). The electronic chip 102 receives the first request and communicates the details of the remaining payment modes to the terminal device 108 (as shown by arrow 530). The terminal device 108 displays the details of all the payment modes including the default payment mode on the graphical interface to the user 104 (as shown by arrow 532). From the displayed payment modes, the user 104 may select any number of payment modes across which the user 104 wants to split the transaction amount. In one example, the user 104 selects the first and second payment modes for carrying out the transaction (as shown by arrows 534a and 534b). In one example, the first and second payment modes are first and second transaction cards that are added to the electronic chip 102. In another example, the first and second payment modes are first and second digital wallets that are added to the electronic chip 102. In another example, one of the first and second payment modes is a transaction card and the other is a digital wallet.

Based on the selection of the first and second payment modes, the terminal device 108 prompts the user 104 to provide details of first and second parts of the transaction amount that are to be charged to the first and second payment modes, respectively. The user 104 then specifies the first and second parts that are to be charged to the first and second payment modes, respectively (as shown by arrow 534b). For example, when the transaction amount is $2,000, the first part may be equal to $1,200 and the second part may be equal to $800.

The terminal device 108 then generates two authorization requests, for example, first and second authorization requests, for initiating authorization of the split transaction from the first and second payment modes, respectively (as shown by arrow 536). The terminal device 108 communicates the authorization requests to the acquirer server 110 (as shown by arrow 538). The acquirer server 110 receives the authorization requests from the terminal device 108 and identifies payment network/s that correspond/s to the first and second payment modes, as known by those skilled in the art. In one example, the first and second payment modes may be associated with the same payment network. In another example, the first and second payment modes may be associated with different payment networks. For the sake of brevity, it is assumed that the first and second payment modes are associated with the same payment network.

The acquirer server 110 then communicates the authorization requests to the payment network server 112 of the identified payment network (as shown by arrow 540). The payment network server 112 receives the authorization requests and identifies issuer/s that correspond/s to the first and second payment modes, as known by those skilled in the art. In one example, the first and second payment modes may be associated with the same issuer. In another example, the first and second payment modes may be associated with different issuers. For the sake of brevity, it is assumed that the first and second payment modes are associated with the same issuer. Once the issuer is identified, the payment network server 112 communicates the authorization requests to the issuer server 114 of the identified issuer (as shown by arrow 542). The issuer server 114 verifies the details of the first and second payment modes and approves the split transaction. The issuer server 114 generates two authorization responses, for example first and second authorization responses (as shown by arrow 544). The first authorization response may correspond to the first authorization request and the second authorization response may correspond to the second authorization request. The issuer server 114 further communicates the authorization responses to the payment network server 112 (as shown by arrow 546). The payment network server 112 receives the authorization responses and communicates the received authorization responses to the acquirer server 110 (as shown by arrow 548). The acquirer server 110 communicates the authorization responses to the terminal device 108 (as shown by arrow 550). The terminal device 108 displays on the rendered graphical interface, a message to indicate whether the split transaction is approved or declined (as shown by arrow 552).

In one embodiment, the user 104 may reject the default payment mode for the transaction and may split the transaction amount across one or more remaining payment modes. In one embodiment, the terminal device 108 may be configured to authorize the transaction offline. For example, if a payment mode selected by the user 104 for conducting the transaction has a spending limit that is less than the transaction amount, the terminal device 108 may either decline the transaction offline or may prompt the user 104 to select another payment mode from the remaining payment modes. In another example, if a payment mode selected by the user 104 for conducting the transaction has an overdraft limit that is greater than or equal to the transaction amount, the terminal device 108 may approve the transaction offline. In another example, if a payment mode selected by the user 104 for conducting the transaction is expired, the terminal device 108 may either decline the transaction offline or may prompt the user 104 to select another payment mode from the remaining payment modes. The information pertaining to the spending limit, the overdraft limit, the expiry date, or the like may be stored in the electronic chip 102 and may be communicated to the terminal device 108 by the electronic chip 102 when the corresponding payment mode is selected by the user 104 for carrying out the transaction.

Figure 6A:
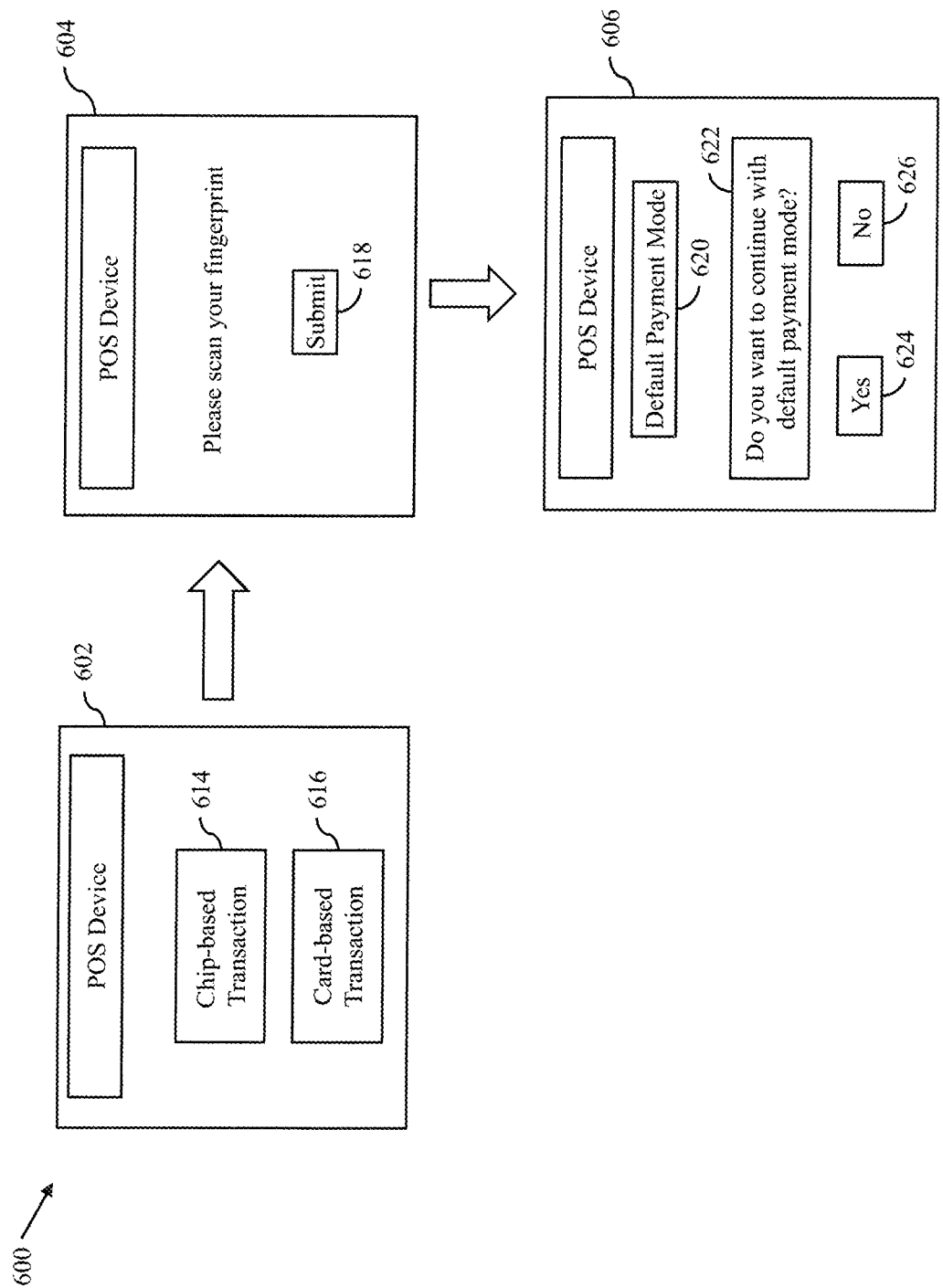
FIGS. 6A-6C, collectively represent an exemplary scenario that illustrates user interface (UI) screens rendered on a terminal device of FIG. 1 for enabling users to conduct transactions at the terminal device, in accordance with an exemplary embodiment of the disclosure.
Figure 6B:
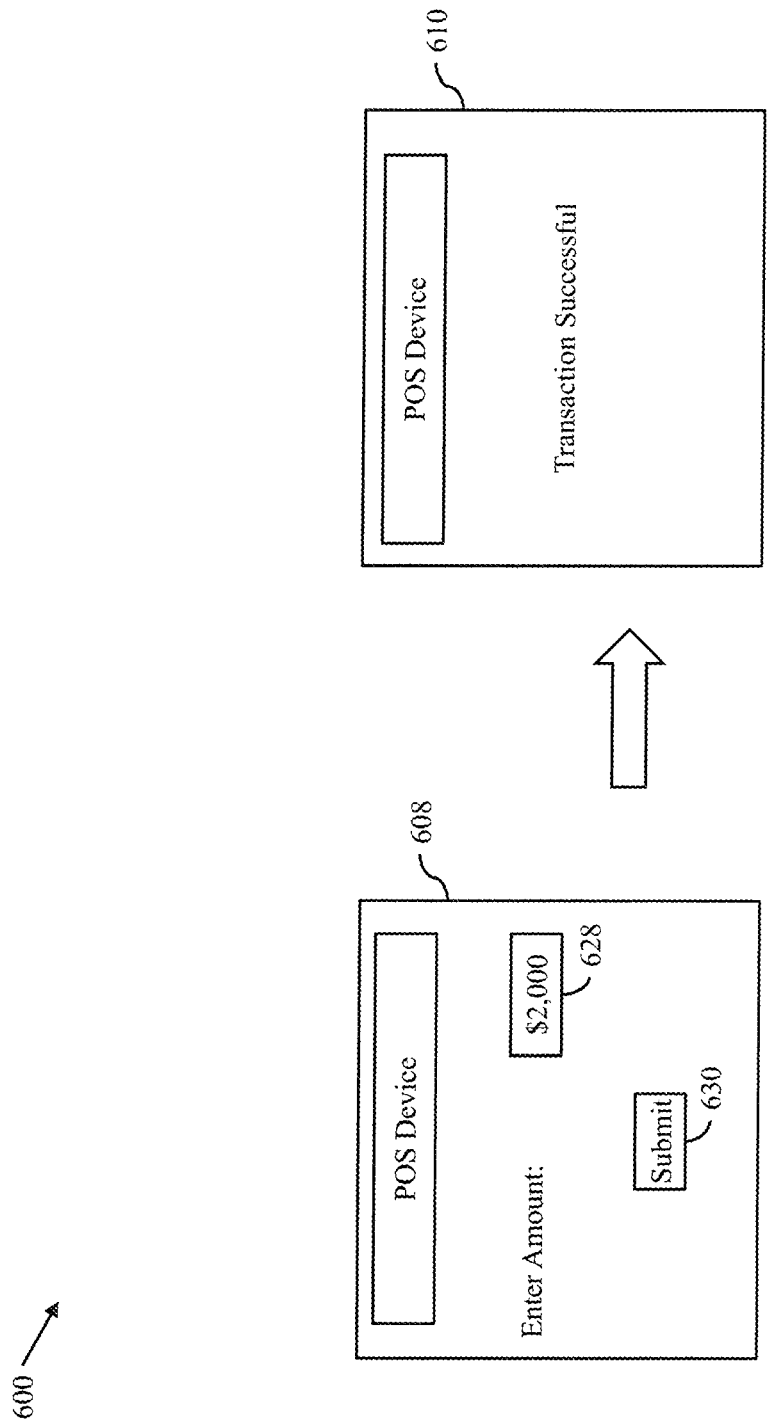
Figure 6C:
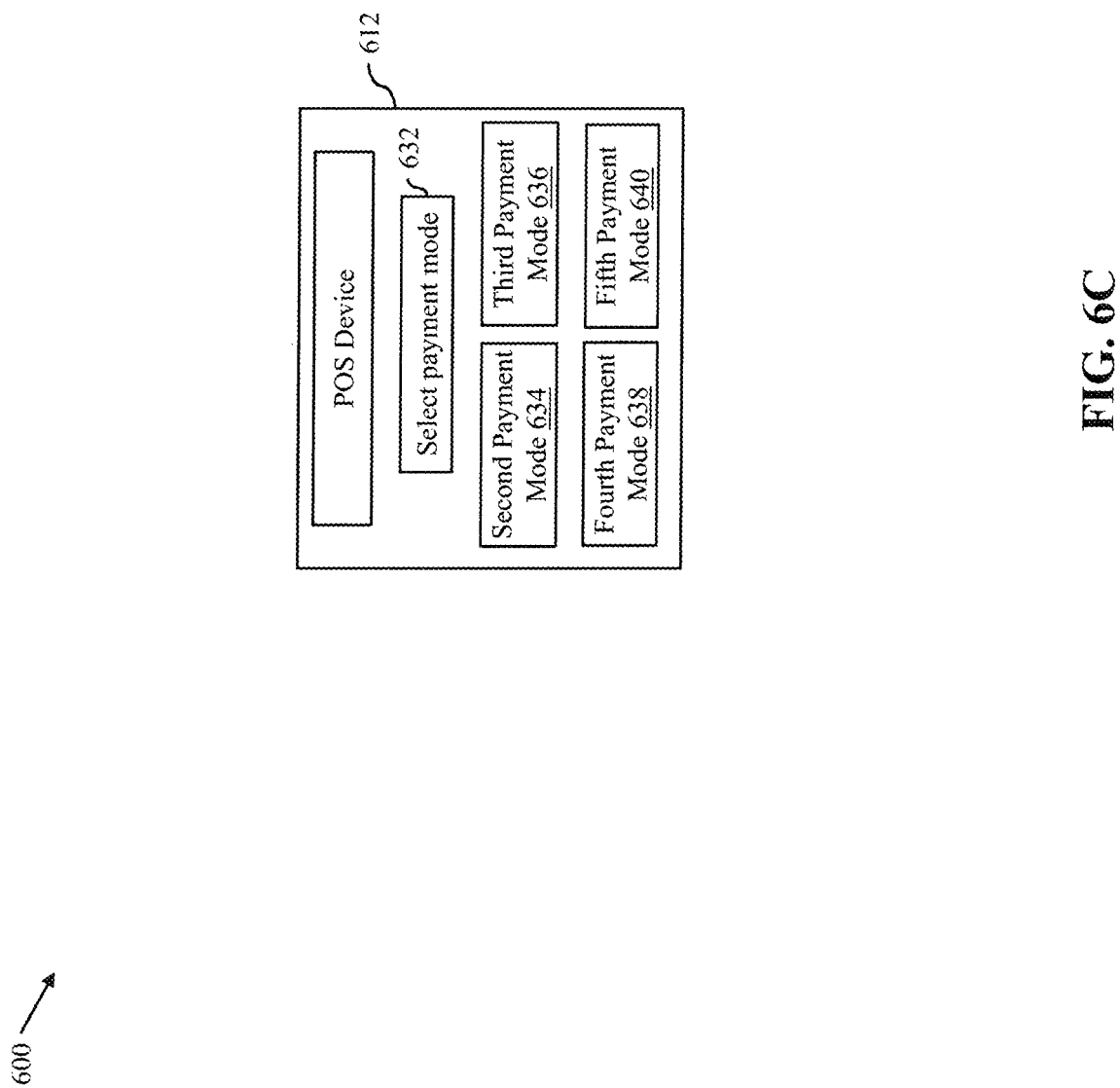

FIGS. 6A-6C, collectively represent an exemplary scenario 600 that illustrates first through sixth user interface (UI) screens 602, 604, 606, 608, 610, and 612 rendered on the terminal device 108 for enabling users to conduct transactions at the terminal device 108, in accordance with an exemplary embodiment of the disclosure. In a non-limiting example, the terminal device 108 is shown to be a POS device in FIGS. 6A-6C, however in other embodiments, the terminal device 108 may be a POP device, a POI device, an ATM device, or the like.

When the user 104 interacts with the terminal device 108 for initiating the transaction, the first UI screen 602 is rendered on a display (not shown) of the terminal device 108. The first UI screen 602 may prompt the user 104 to select one of a 'chip-based transaction' button 614 or a 'card-based transaction' button 616. The 'chip-based transaction' button 614 represents the chip-based transaction option and the 'card-based transaction' button 616 represents the card-based transaction option. When the user 104 selects or activates the 'card-based transaction' button 616, the transaction is processed based on a conventional four-party system or a conventional three-party system as known by those skilled in the art. When the user 104 selects the 'chip-based transaction' button 614, the terminal device 108 may render the second UI screen 604.

The second UI screen 604 may display a message requesting the user 104 to provide the first authentication parameter (e.g., a fingerprint). The second UI screen 604 may further display a first submit button 618, which is selectable by the user 104 for submitting the first authentication parameter. When the user 104 provides the first authentication parameter (e.g., a fingerprint) and selects or activates the first submit button 618, the terminal device 108 may communicate the authentication request, including the first authentication parameter, to the electronic chip 102. After the electronic chip 102 performs authentication, the terminal device 108 receives the authentication response including the details of the default payment mode. After receiving the authentication response, the terminal device 108 may render the third UI screen 606.

The third UI screen 606 displays a 'default payment mode' button 620. The 'default payment mode' button 620 corresponds to the default payment mode. The third UI screen 606 further displays a message in a first text box 622 to inquire whether the user 104 wants to continue the transaction using the default payment mode. The message further prompts the user 104 to select a 'Yes' button 624 displayed by the third UI screen 606 if the user 104 wants to continue the transaction using the default payment mode, and to select a 'No' button 626 displayed by the third UI screen 606 if the user 104 does not want to continue the transaction using the default payment mode. When the user 104 selects or activates the 'Yes' button 624, the terminal device 108 renders the fourth UI screen 608, as described in FIG. 6B. When the user 104 selects or activates the 'No' button 626, the terminal device 108 renders the sixth UI screen 612, as described in FIG. 6C. In another embodiment, the fourth UI screen 608 may further present a 'split transaction' button (not shown) to the user 104 for enabling to user 104 to perform a split transaction.

With reference to FIG. 6B, the terminal device 108 renders the fourth UI screen 608 when the user 104 selects or activates the 'Yes' button 624 as shown in FIG. 6A. The fourth UI screen 608 may display a first input box 628 to enter the transaction amount of the transaction. The fourth UI screen 608 may further display a second submit button 630 which is selectable by the user 104. When the transaction amount is entered in the first input box 628 and the second submit button 630 is activated or selected, the terminal device 108 generates the authorization request including the details of the selected payment mode and the transaction details. The terminal device 108 further communicates the authorization request to the acquirer server 110. The terminal device 108 renders the fifth UI screen 610 to display a message indicating whether the transaction is approved or declined by the issuer server 114.

With reference to FIG. 6C, the terminal device 108 renders the sixth UI screen 612 when the user 104 selects or activates the 'No' button 626 as shown in FIG. 6A. The 'No' button 626 corresponds to the first option as described in the foregoing description of FIG. 4A. The terminal device 108 communicates the first request to the electronic chip 102 for retrieving the details of the remaining payment modes. Based on the first response received from the electronic chip 102, the terminal device 108 renders the sixth UI screen 612 on the graphical interface. The sixth UI screen 612 displays another message in a second text box 632 for prompting the user 104 to select a payment mode/s from a displayed list of payment modes for carrying out the transaction. In a non-limiting example, the list of payment modes is shown to include second, third, fourth, and fifth payment modes represented by buttons 634, 636, 638, and 640, respectively. The user 104 may select any one of the buttons 634-640. Based on the selection of the payment mode, the terminal device 108 renders the fourth UI screen 608, as described in FIG. 6B.

It another embodiment, when the terminal device 108 is an ATM, the user 104 may select the chip-based transaction option for withdrawing cash (e.g., $500) at the ATM. The method for conducting the transaction at the ATM is similar to conducting the transaction at the POS device.

FIG. 7 represents an exemplary scenario for conducting the transaction using the electronic chip 102 at the terminal device 108, in accordance with an exemplary embodiment of the disclosure. The terminal device 108 is shown to be a POS device 108 for the sake of ongoing description. The POS device 108 includes a display screen 702 and a fingerprint scanner 704.

The user 104 may initiate a transaction using the chip-based transaction option displayed on the display screen 702 of the POS device 108. The POS device 108 then detects the presence of any electronic chip within a predefined distance 706 (i.e., the first distance). When the electronic chip 102 is detected to be present within the predefined distance 706, the POS device 108 establishes the bi-directional communication link 118 between the POS device 108 and the electronic chip 102. The POS device 108 further displays a message on the display screen 702 to notify the user 104 that the electronic chip 102 having the electronic chip ID 'ab123' is detected for the transaction.

The POS device 108 then prompts the user 104 to provide the first authentication parameter. For example, as shown in FIG. 7, the POS device 108 may display a message on the display screen 702 for prompting the user 104 to scan a fingerprint using the fingerprint scanner 704. The user 104 then places a finger on the fingerprint scanner 704 for providing a fingerprint (i.e., the first authentication parameter) to the POS device 108. The POS device 108 then communicates with the electronic chip 102 by way of the bi-directional communication link 118 for authenticating the user 104. When the user 104 is successfully authenticated by the electronic chip 102, the POS device 108 receives the authentication response from the electronic chip 102 and displays another message on the display screen 702 to notify the user 104 that authentication is successful. The user 104 may then select one of the payment modes added to the electronic chip 102 for carrying out the transaction as described in the foregoing description of FIGS. 4A-4C and 5A-5B. By implementing 'one touch payment authorization', the electronic chip 102 and the POS device 108 enable the user 104 to conduct secure and hassle-free transactions.

Figure 8:
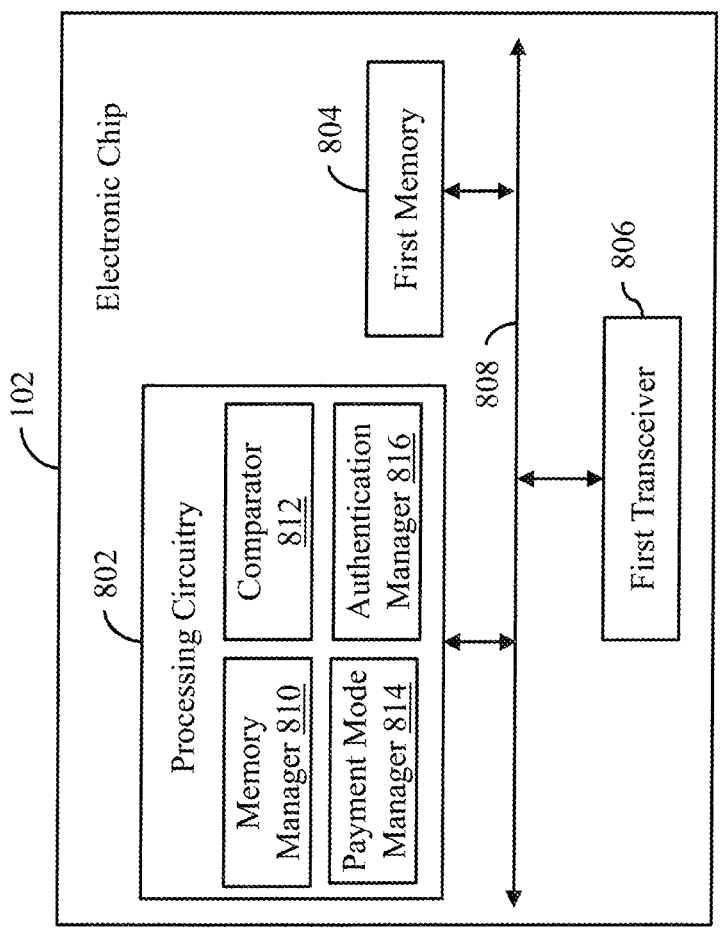
FIG. 8 is a block diagram that illustrates the electronic chip of FIG. 1, in accordance with an exemplary embodiment of the disclosure.

FIG. 8 is a block diagram that illustrates the electronic chip 102, in accordance with an exemplary embodiment of the disclosure. The electronic chip 102 includes processing circuitry 802, a first memory 804, and a first transceiver 806. The processing circuitry 802, the first memory 804, and the first transceiver 806 communicate with each other by way of a first communication bus 808.

The processing circuitry 802 includes suitable logic, circuitry, interfaces, and/or code, executable by the circuitry, for enabling the user 104 to conduct transactions at the terminal device 108 by using the electronic chip 102. Examples of the processing circuitry 802 may include, but are not limited to, an integrated circuit, a field programmable gate array (FPGA), or the like. The processing circuitry 802 includes a memory manager 810, a comparator 812, a payment mode manager 814, and an authentication manager 816.

The memory manager 810 is configured to store the details of the payment modes in the first memory 804 and manage the stored details. The memory manager 810 may execute operations (such as, storing data, updating the stored data, or deleting the stored data) on the first memory 804 based on the instructions received from the user device 106. In one embodiment, the memory manager 810 may further update the stored data (for example, the overdraft limit of an added payment mode) based on an update request from the issuer server 114. The update request of the issuer server 114 may be received by the electronic chip 102 from the user device 106 and/or the terminal device 108. The memory manager 810 is configured to store the sample authentication parameters of the user 104 in the first memory 804. The memory manager 810 is further configured to retrieve the details of the payment modes from the first memory 804 for communicating to the terminal device 108.

The comparator 812 includes suitable logic, circuitry, interfaces, and/or code, executable by the circuitry, for comparing the first authentication parameter with the sample authentication parameters for authenticating the user 104. In one example, the comparator 812 compares the first authentication parameter received from the terminal device 108 with the sample authentication parameters stored in the first memory 804 and generates a comparison output (i.e., '0' or '1'). The comparison output '0' indicates that authentication has failed and the comparison output '1' indicates that authentication is successful. In one embodiment, the memory manager 810 may retrieve the details of the payment modes from the first memory 804 for communicating to the terminal device 108 only when the comparison output is '1'.

The payment mode manager 814 is configured to select the default payment mode for the transactions. When the comparison output is '1', the payment mode manager 814 selects the default payment mode from the payment modes that are added to the electronic chip 102. The selection of the default payment mode is described in the foregoing description of FIG. 4A. The payment mode manager 814 further instructs the memory manager 810 to retrieve the details of the default payment mode based on the selection of the default payment mode for communicating to the terminal device 108.

The authentication manager 816 is configured to generate the authentication response based on the comparison output generated by the comparator 812. If the comparison output is '0', the authentication response may indicate that the authentication has failed. If the comparison output is '1', the authentication response may include the details of the default payment mode selected by the payment mode manager 814 and may further indicate that the authentication is successful.

The first memory 804 includes suitable logic, circuitry, interfaces, and/or code, executable by the circuitry, for storing the sample authentication parameters of the user 104 and the details of the payment modes that are added to the electronic chip 102 by the user 104. The first memory 804 may further store additional details associated with the added payment modes such as the spending limits, the overdraft limits, or the like. Examples of the first memory 804 may include, but are not limited to, a random-access memory (RAM), a read-only memory (ROM), a flash memory, a solid-state memory, or the like.

The first transceiver 806 includes suitable logic, circuitry, interfaces and/or code, executable by the circuitry, for transmitting and receiving data via the bi-directional communication link 118 and the communication link between the user device 106 and the electronic chip 102, using one or more NFC protocols. The first transceiver 806 receives various requests and messages from the terminal device 108 and the user device 106. For example, the first transceiver 806 receives the authentication request from the terminal device 108. The first transceiver 806 further receives the first request for the details of the payment modes from the terminal device 108. The first transceiver 806 transmits various requests and messages to the terminal device 108 and the user device 106. For example, the first transceiver 806 transmits the authentication response to the terminal device 108. The first transceiver 806 further transmits the first response to the terminal device 108. Examples of the first transceiver 806 may include, but are not limited to, an antenna, a radio frequency transceiver, a wireless transceiver, a Bluetooth transceiver, a Zigbee transceiver, or any other device configured to transmit and receive data.

Figure 9:
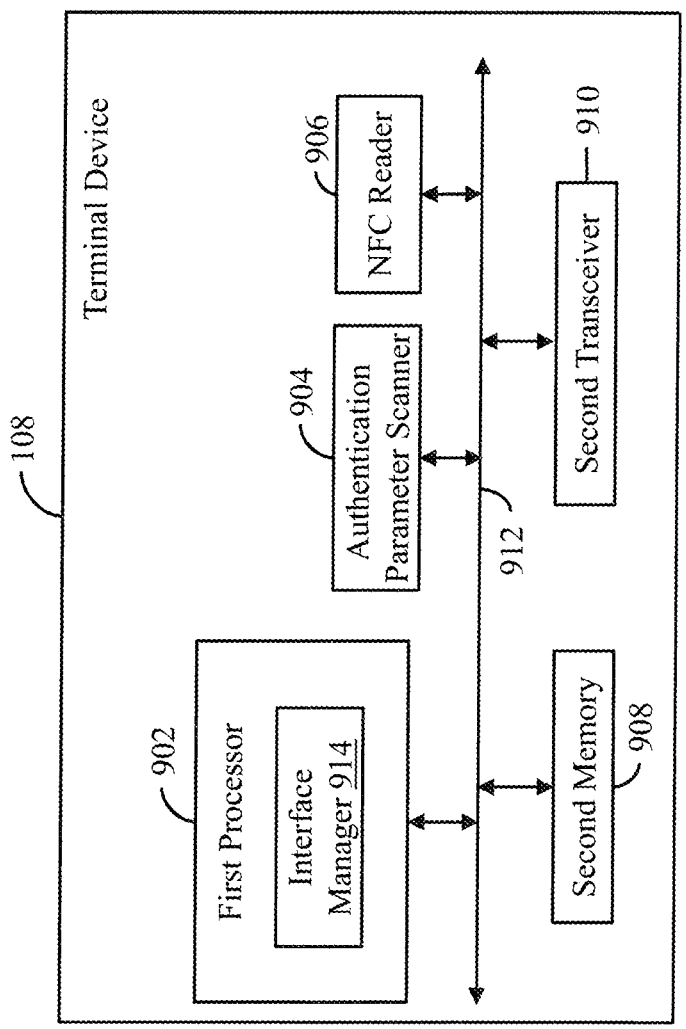
FIG. 9 is a block diagram that illustrates the terminal device server of FIG. 1, in accordance with an exemplary embodiment of the disclosure.

FIG. 9 is a block diagram that illustrates the terminal device 108, in accordance with an exemplary embodiment of the disclosure. The terminal device 108 includes a first processor 902, an authentication parameter scanner 904, an NFC reader 906, a second memory 908, and a second transceiver 910. The first processor 902, the authentication parameter scanner 904, the NFC reader 906, the second memory 908, and the second transceiver 910 communicate with each other by way of a second communication bus 912.

The first processor 902 includes suitable logic, circuitry, interfaces, and/or code, executable by the circuitry, to process transactions initiated at the terminal device 108. The first processor 902 may generate the authentication request for authenticating the user 104. For example, when the user 104 initiates the transaction at the terminal device 108 and provides the first authentication parameter, the first processor 902 generates and communicates the authentication request, including the first authentication parameter, to the electronic chip 102. The first processor 902 further communicates the first request to the electronic chip 102 as described in the foregoing description of FIGS. 4B and 5B. Examples of the first processor 902 may include, but are not limited to, an application specific integrated circuit (ASIC) processor, a reduced instruction set computer (RISC) processor, a complex instruction set computer (CISC) processor, an FPGA, or the like.

The first processor 902 may include an interface manager 914. The interface manager 914 renders the first through sixth UI screens 602-612 (as described in FIGS. 6A-6C) on the display of the terminal device 108 based on instructions received from the first processor 902. For example, when the user 104 initiates the transaction, the interface manager 914 renders the first UI screen 602 on the display of the terminal device 108. When the 'chip-based transaction' button 614 is selected by the user 104, the interface manager 914 further renders the second UI screen 604 on the display of the terminal device 108. The interface manager 914 further renders the third UI screen 606 for displaying the default payment mode received from the electronic chip 102. The interface manager 914 further renders the fourth through sixth UI screens 608-612 based on the selection of the 'Yes' or 'No' button 624 or 626 by the user 104 as described in the foregoing description of FIGS. 6A-6C.

The authentication parameter scanner 904 may include suitable logic, circuitry, interfaces, and/or code, executable by the circuitry, to scan the first authentication parameter provided by the user 104. In one example, the authentication parameter scanner 904 may be the fingerprint scanner 704. In another example, the authentication parameter scanner 904 may be a retina scanner, a faceprint scanner, a gesture recognition camera, a voiceprint scanner, or the like.

The NFC reader 906 is configured to establish the bi-directional communication link 118 with the electronic chip 102. The NFC reader 906 communicates various request and messages to the electronic chip 102 through the bi-directional communication link 118. For example, the NFC reader 906 communicates the authentication request and the first request to the electronic chip 102 through the bi-directional communication link 118. The NFC reader 906 further receives the authentication response and the first response from the electronic chip 102 through the bi-directional communication link 118.

The second memory 908 includes suitable logic, circuitry, interfaces, and/or code, executable by the circuitry, for processing the transactions initiated at the terminal device 108. Examples of the second memory 908 may include, but are not limited to, a RAM, a ROM, a removable storage drive, a hard-disk drive (HDD), a flash memory, a solid-state memory, or the like. It will be apparent to a person skilled in the art that the scope of the disclosure is not limited to realizing the second memory 908 in the terminal device 108, as described herein. In another embodiment, the second memory 908 may be realized in form of a database server or a cloud storage working in conjunction with the terminal device 108, without departing from the scope of the disclosure.

The second transceiver 910 includes suitable logic, circuitry, interfaces and/or code, executable by the circuitry, for transmitting and receiving data over the communication network 116 using one or more communication protocols. The second transceiver 910 transmits various requests and messages to the acquirer server 110. For example, the second transceiver 910 transmits the authorization request to the acquirer server 110. The second transceiver 910 receives various requests and messages from the acquirer server 110. For example, the second transceiver 910 receives the authorization response from the acquirer server 110. Examples of the second transceiver 910 may include, but are not limited to, an antenna, a radio frequency transceiver, a wireless transceiver, a Bluetooth transceiver, an Ethernet port, a universal serial bus (USB) port, or any other device configured to transmit and receive data.

Figure 10:
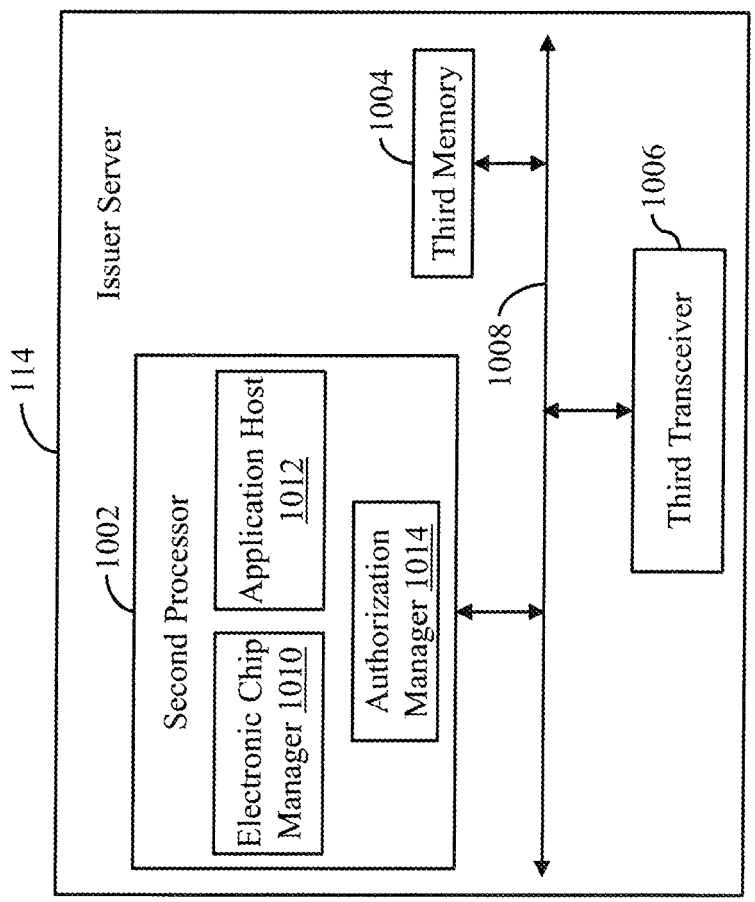
FIG. 10 is a block diagram that illustrates an issuer server of FIG. 1, in accordance with an exemplary embodiment of the disclosure.

FIG. 10 is a block diagram 1000 that illustrates the issuer server 114, in accordance with an exemplary embodiment of the disclosure. The issuer server 114 includes a second processor 1002, a third memory 1004, and a third transceiver 1006. The second processor 1002, the third memory 1004, and the third transceiver 1006 communicate with each other by way of a third communication bus 1008.

The second processor 1002 includes suitable logic, circuitry, interfaces, and/or code, executable by the circuitry for authorizing transactions conducted by way of the electronic chip 102. Examples of the second processor 1002 may include, but are not limited to, an ASIC processor, a RISC processor, a CISC processor, a FPGA, or the like. The second processor 1002 includes an electronic chip manager 1010, an application host 1012, and an authorization manager 1014.

The electronic chip manager 1010 is configured to generate the activation key for activating the electronic chip 102. The electronic chip manager 1010 further validates the activation key received from the user device 106. In one embodiment, the electronic chip manager 1010 may store the activation key in the database stored in the third memory 1004.

The application host 1012 hosts the service application 302 that is executable on the user device 106. By way of the service application 302, the application host 1012 allows the user 104 to access the electronic chip 102 for storing the sample authentication parameters and the details of the payment modes in the first memory 804 of the electronic chip 102. The application host 1012 further allows the user 104 to initiate an update request for updating the details stored in the electronic chip 102 by way of the service application 302.

The authorization manager 1014 authorizes the transaction based on the authorization request received from the payment network server 112. Based on the authorization of the transaction, the authorization manager 1014 may generate the authorization response for the transaction.

The third memory 1004 includes suitable logic, circuitry, interfaces, and/or code, executable by the circuitry, for storing the account profiles of various user accounts that are maintained at the issuer server 114. The third memory 1004 further stores the authorization requests of various transactions that are associated with the issuer server 114. The third memory 1004 further stores the database that includes electronic chip IDs of all electronic chips issued by the issuer of the issuer server 114. The database further stores the activation status of each electronic chip issued by the issuer of the issuer server 114. Examples of the third memory 1004 may include, but are not limited to, a RAM, a ROM, a removable storage drive, an HDD, a flash memory, a solid-state memory, or the like. It will be apparent to a person skilled in the art that the scope of the disclosure is not limited to realizing the third memory 1004 in the issuer server 114, as described herein. In another embodiment, the third memory 1004 may be realized in form of a database server or a cloud storage working in conjunction with the issuer server 114, without departing from the scope of the disclosure.

The third transceiver 1006 includes suitable logic, circuitry, interfaces and/or code, executable by the circuitry, for transmitting and receiving data over the communication network 116 using one or more communication protocols. The third transceiver 1006 receives various requests and messages from the user device 106 and the payment network server 112. For example, the third transceiver 1006 receives the request for validation of the activation key from the user device 106. The third transceiver 1006 further receives the authorization requests from the payment network server 112. The third transceiver 1006 transmits various requests and messages to the user device 106 and the payment network server 112. For example, the third transceiver 1006 transmits the activation command to the user device 106. The third transceiver 1006 further transmits the authorization responses of the transactions to the payment network server 112. Examples of the third transceiver 1006 may include, but are not limited to, an antenna, a radio frequency transceiver, a wireless transceiver, an Ethernet port, a USB port, or any other device configured to transmit and receive data.

Figure 11A:
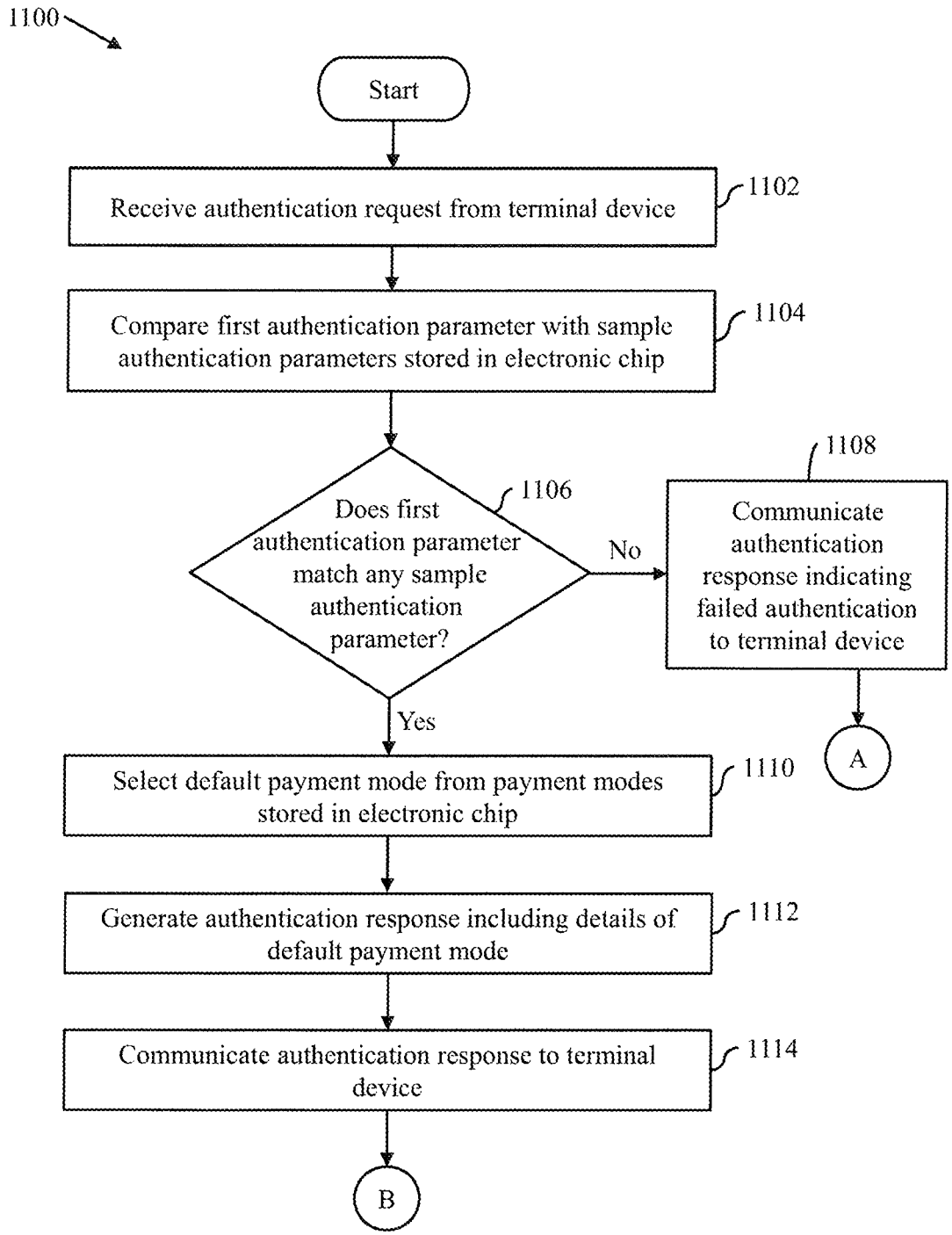
FIGS. 11A and 11B, collectively represent a flow chart that illustrates a method for conducting transactions using the electronic chip of FIG. 1, in accordance with an exemplary embodiment of the disclosure.
Figure 11B:
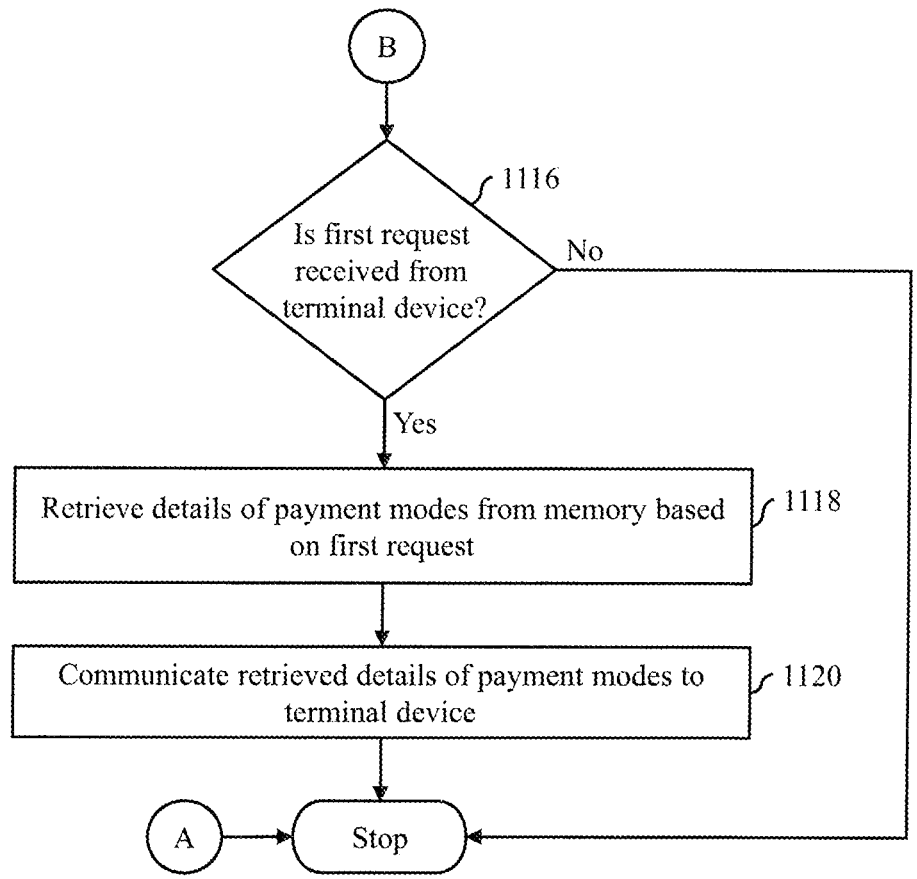

FIGS. 11A and 11B, collectively represent a flow chart 1100 that illustrates the method for conducting transactions using the electronic chip 102, in accordance with an exemplary embodiment of the disclosure. At step 1102, the electronic chip 102 receives the authentication request from the terminal device 108. The authentication request includes the first authentication parameter of the user 104. At step 1104, the electronic chip 102 compares the first authentication parameter with the sample authentication parameters stored in the electronic chip 102. At step 1106, the electronic chip 102 determines whether the first authentication parameter matches any sample authentication parameter. If at step 1106, the electronic chip 102 determines that the first authentication parameter does not match any sample authentication parameter, step 1108 is performed. At step 1108, the electronic chip 102 communicates the authentication response indicating failed authentication to the terminal device 108 and the transaction ends. If at step 1106, the electronic chip 102 determines that the first authentication parameter matches a sample authentication parameter, step 1110 is performed. At step 1110, the electronic chip 102 selects the default payment mode from the payment modes stored in the electronic chip 102. At step 1112, the electronic chip 102 generates the authentication response including the details of the default payment mode. At step 1114, the electronic chip 102 communicates the authentication response to the terminal device 108.

With reference to FIG. 11B, at step 1116, the electronic chip 102 determines whether the first request is received from the terminal device 108. The first request may indicate that the user 104 has either initiated a split transaction or the user 104 has rejected the default payment mode for the transaction. If at step 1116, the electronic chip 102 determines that the first request is not received from the terminal device 108, the process is terminated. If at step 1116, the electronic chip 102 determines that the first request is received from the terminal device 108, step 1118 is performed. At step 1118, the electronic chip 102 retrieves the details of other payment modes from the first memory 804 based on the first request. At step 1120, the electronic chip 102 communicates the retrieved details of the payment modes to the terminal device 108.

Figure 12A:
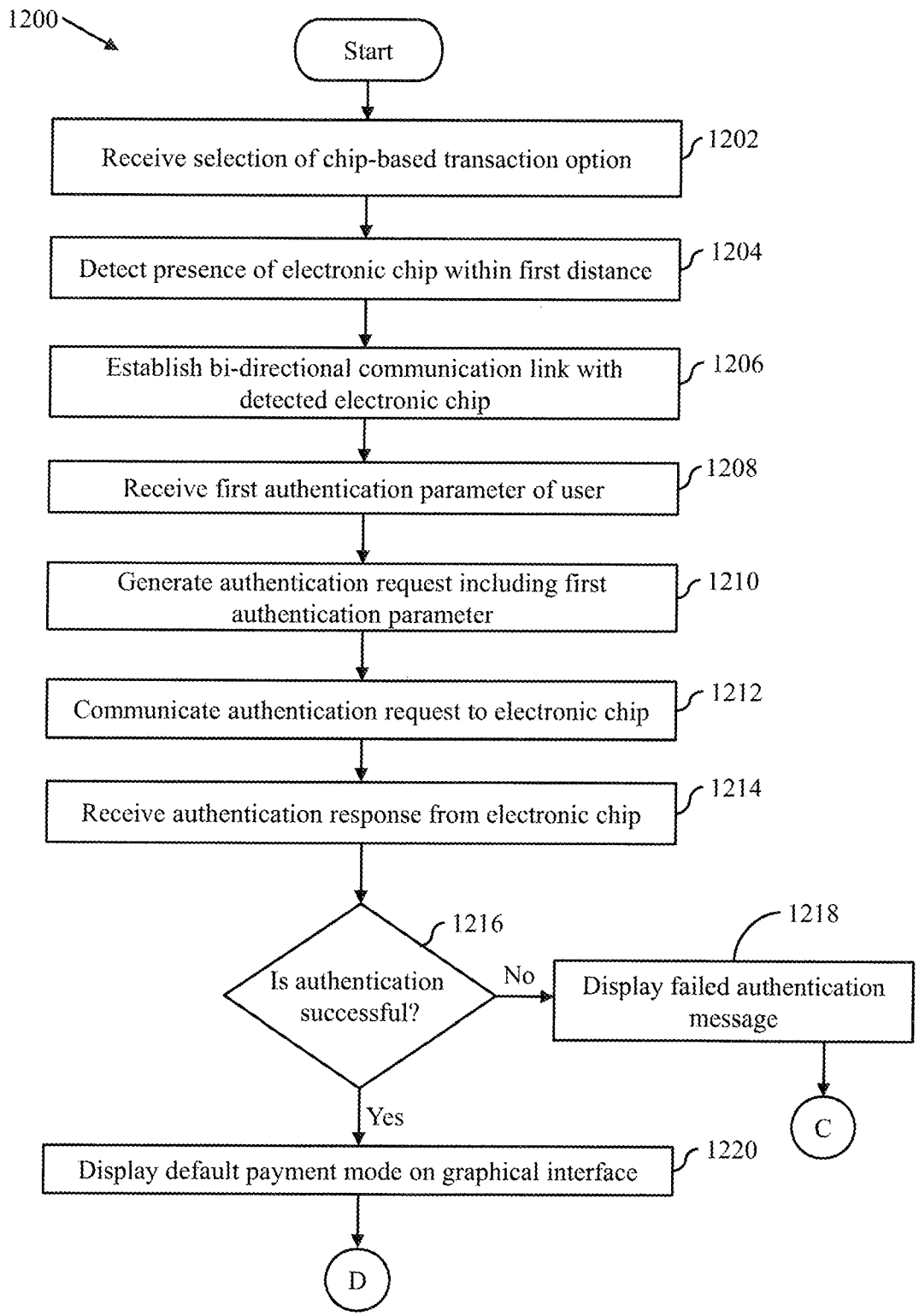
FIGS. 12A and 12B, collectively represent a flow chart that illustrates a method for conducting transactions using an electronic chip at the terminal device of FIG. 1, in accordance with an exemplary embodiment of the disclosure.
Figure 12B:
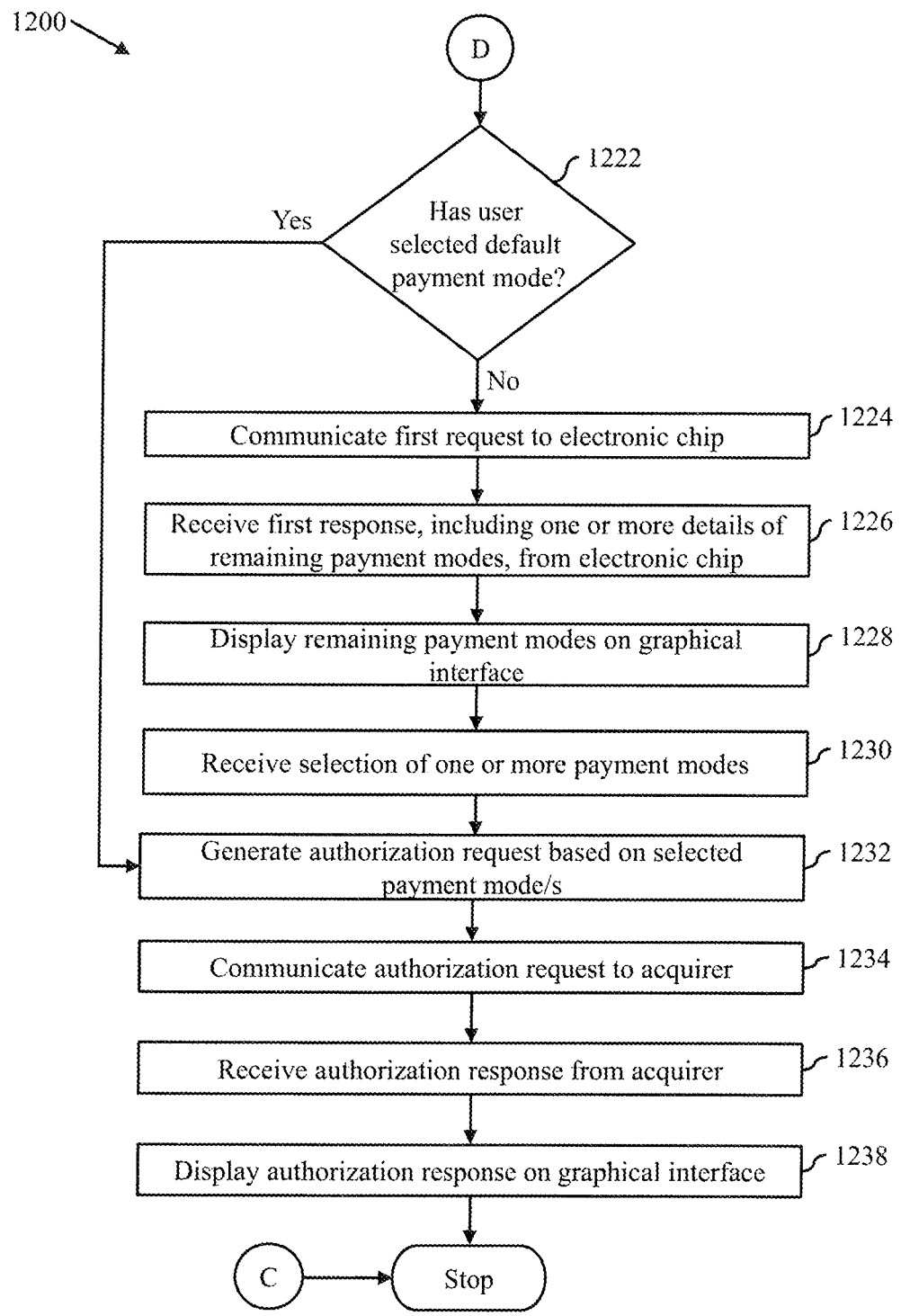

FIGS. 12A and 12B, collectively represent a flow chart 1200 that illustrates the method for conducting transactions using the electronic chip 102 at the terminal device 108, in accordance with an exemplary embodiment of the disclosure. At step 1202, the terminal device 108 receives the selection of the chip-based transaction option. The user 104 may have selected the chip-based transaction option to conduct the transaction using the electronic chip 102. At step 1204, the terminal device 108 detects the presence of an electronic chip (e.g., the electronic chip 102) within the first distance. In a non-limiting example, it is assumed that the electronic chip 102 is present within the first distance from the terminal device 108. At step 1206, the terminal device 108 establishes the bi-directional communication link 118 with the electronic chip 102 when the electronic chip 102 is detected to be present within the first distance from the terminal device 108.

At step 1208, the terminal device 108 receives the first authentication parameter of the user 104. At step 1210, the terminal device 108 generates the authentication request including the first authentication parameter. At step 1212, the terminal device 108 communicates the authentication request to the electronic chip 102. At step 1214, the terminal device 108 receives the authentication response from the electronic chip 102 based on the authentication request. At step 1216, the terminal device 108 determines whether the authentication is successful based on the authentication response. It at step 1216, the terminal device 108 determines that the authentication has failed, step 1218 is performed. At step 1218, the terminal device 108 displays a failed authentication message on the graphical interface to the user 104 and the process ends. If at step 1216, the terminal device 108 determines that the authentication is successful, step 1220 is performed. At step 1220, the terminal device 108 displays the default payment mode, received in the authentication response, on the graphical interface to the user 104.

With reference to FIG. 12B, at step 1222, the terminal device 108 determines whether the user 104 has selected the default payment mode. If at step 1222, the terminal device 108 determines that the user 104 has not selected the default payment mode and has chosen the first option to carry out the transaction using a different payment mode, step 1224 is performed. At step 1224, the terminal device 108 communicates the first request to the electronic chip 102 for obtaining the details of the remaining payment modes. At step 1226, the terminal device 108 receives the first response, including the details of the remaining payment modes, from the electronic chip 102. At step 1228, the terminal device 108 displays the remaining payment modes on the graphical interface to the user 104 for selection. At step 1230, the terminal device 108 receives the selection of one or more payment modes and step 1232 is performed. If at step 1222, it is determined that the user 104 has selected the default payment mode, step 1232 is performed.

At step 1232, the terminal device 108 generates the authorization request based on the selected payment mode/s. At step 1234, the terminal device 108 communicates the authorization request to the acquirer server 110. At step 1236, the terminal device 108 receives the authorization response from the acquirer server 110. At step 1238, the terminal device 108 displays the authorization response on the graphical interface.

Figure 13:
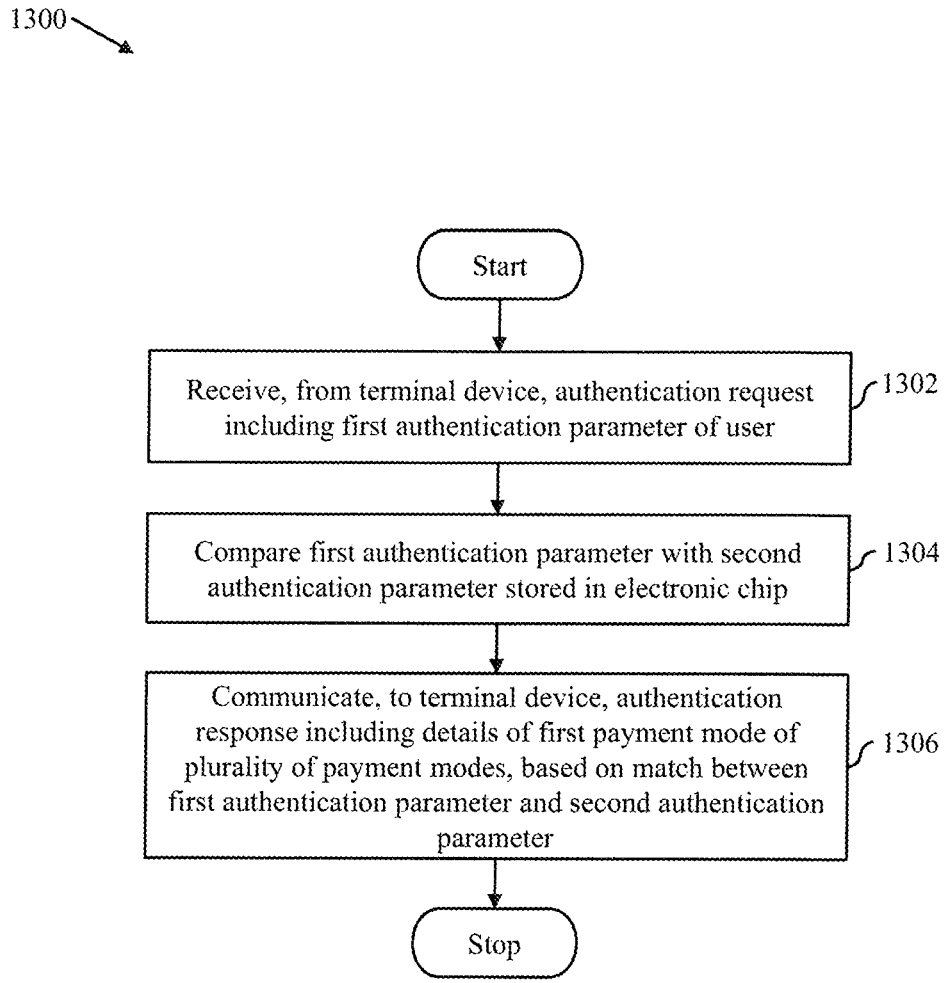
FIG. 13 represents a high-level flow chart that illustrates a method for conducting transactions using the electronic chip of FIG. 1, in accordance with an exemplary embodiment of the disclosure.

FIG. 13 represents a high-level flow chart 1300 that illustrates the method for conducting transactions using the electronic chip 102, in accordance with an exemplary embodiment of the disclosure. At step 1302, the electronic chip 102, receives from the terminal device 108, the authentication request including the first authentication parameter of the user 104 when the transaction is initiated at the terminal device 108. One or more details of a plurality of payment modes of the user 104 are stored in the electronic chip 102. At step 1304, the electronic chip 102 compares the first authentication parameter with the second authentication parameter stored in the electronic chip 102. At step 1306, the electronic chip 102 communicates the authentication response including the details of a first payment mode of the plurality of payment modes to the terminal device 108. The authentication response is communicated based on a match between the first authentication parameter and the second authentication parameter. The transaction is processed based on the authentication response.

Figure 14:
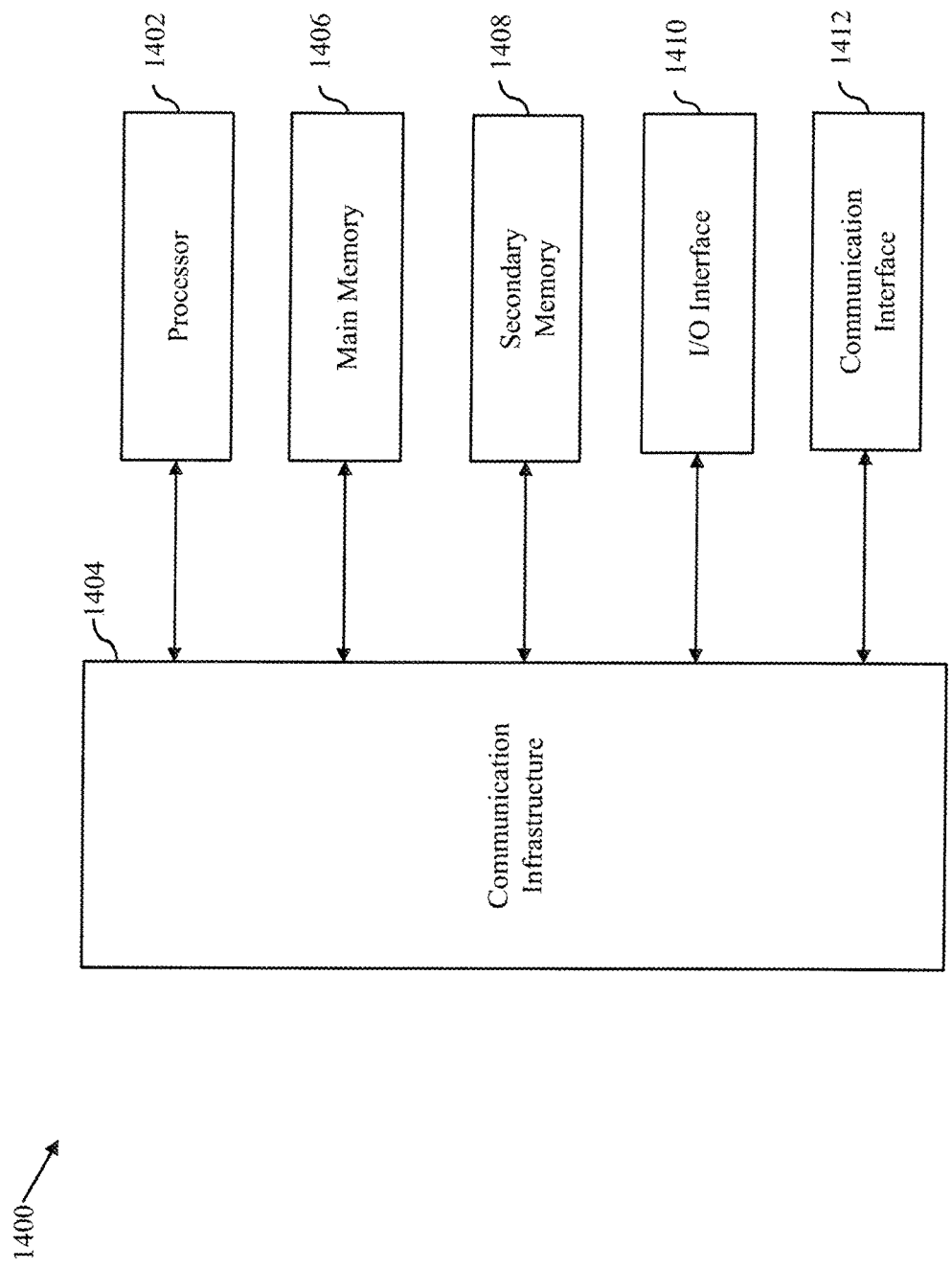
FIG. 14 is a block diagram that illustrates system architecture of a computer system, in accordance with an exemplary embodiment of the disclosure.

FIG. 14 is a block diagram that illustrates system architecture of a computer system 1400, in accordance with an exemplary embodiment of the disclosure. An embodiment of disclosure, or portions thereof, may be implemented as computer readable code on the computer system 1400. In one example, the acquirer server 110, the payment network server 112, and the issuer server 114 may be implemented in the computer system 1400.

The computer system 1400 includes a processor 1402 that may be a special-purpose or a general-purpose processing device. The processor 1402 may be a single processor, multiple processors, or combinations thereof. The processor 1402 may have one or more processor cores. In one example, the processor 1402 is an octa-core processor. Further, the processor 1402 may be connected to a communication infrastructure 1404, such as a bus, message queue, multi-core message-passing scheme, and the like. The computer system 1400 may further include a main memory 1406 and a secondary memory 1408. Examples of the main memory 1406 may include RAM, ROM, and the like. The secondary memory 1408 may include a hard disk drive or a removable storage drive, such as a floppy disk drive, a magnetic tape drive, a compact disc, an optical disk drive, a flash memory, and the like. Further, the removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 1400 further includes an input/output (I/O) interface 1410 and a communication interface 1412. The I/O interface 1410 includes various input and output devices that are configured to communicate with the processor 1402. Examples of the input devices may include a keyboard, a mouse, a joystick, a touchscreen, a microphone, and the like. Examples, of the output devices may include a display screen, a speaker, headphones, and the like. The communication interface 1412 may be configured to allow data to be transferred between the computer system 1400 and various devices that are communicatively coupled to the computer system 1400. Examples of the communication interface 1412 may include a modem, a network interface, i.e., an Ethernet card, a communications port, and the like. Data transferred via the communication interface 1412 may correspond to signals, such as electronic, electromagnetic, optical, or other signals as will be apparent to a person skilled in the art. The signals may travel via a communications channel (not shown) which may be configured to transmit the signals to devices that are communicatively coupled to the computer system 1400. Examples of the communications channel may include, but are not limited to, cable, fiber optics, a phone line, a cellular phone link, a radio frequency link, and the like. Computer program medium and computer usable medium may refer to memories, such as the main memory 1406 and the secondary memory 1408, which may be a semiconductor memory such as a DRAM. These computer program mediums may provide data that enables the computer system 1400 to implement the methods illustrated in FIGS. 11-13.

A person of ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor such as the processor 1402 and a memory such as the main memory 1406 and the secondary memory 1408 implements the above described embodiments. Further, the operations may be described as a sequential process, however some of the operations may in fact be performed in parallel, concurrently, and/or in a distributed environment. In addition, in some embodiments the order of operations may be rearranged without departing from the spirit of the disclosed subject matter.

Thus, the combination of the electronic chip 102 and the terminal device 108 enables one touch payment authorization and allows the user 104 to conduct secure and hassle-free transactions. Since the user 104 is allowed to add any number of payment modes to the electronic chip 102 and link all the added payment modes to one or more sample authentication parameters, the user 104 is saved from the hassle of carrying multiple payment modes and remembering passwords or PINs of all the payment modes. Technological improvements in the electronic chip 102 enable the electronic chip 102 to store the details of both transaction cards and digital wallets, thus offering a one-stop solution to the user 104 for all types of transactions. Since the electronic chip 102 is either placed on a user's wearable device (as shown in FIG. 2A) or placed under the user's skin (as shown in FIG. 2B), the likelihood of skimming fraud is reduced. In addition, details stored in the electronic chip 102 can only be retrieved by way of the first authentication parameter of the user 104 that matches one of the sample authentication parameters stored in the electronic chip 102, thus making the electronic chip 102 immune to skimming fraud. Technological improvements in the terminal device 108 allow the terminal device 108 to establish the bi-directional communication link 118 only with genuine electronic chips. As the electronic chip 102 and the terminal device 108 perform the authentication process offline by way of a short-range wireless communication link (i.e., the bi-directional communication link 118), the processing overhead of the issuer server 114 and the processing time for the transaction are reduced.

Techniques consistent with the disclosure provide, among other features, systems and methods for conducting transactions using electronic chips (e.g., the electronic chip 102). While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method of conducting a transaction using an electronic chip, the method comprising:
   receiving, by the electronic chip from a terminal device, an authentication request including a first authentication parameter of a user acquired at the terminal device when the transaction is initiated at the terminal device, wherein one or more details of a plurality of payment modes of the user are stored in the electronic chip, and wherein the electronic chip is associated with a payment device that is separate from the terminal device;
   comparing, by the electronic chip, the first authentication parameter with a second authentication parameter stored in the electronic chip;
   authenticating, by the electronic chip, the user based on the comparing; and
   communicating, by the electronic chip to the terminal device, based on the authenticating, an authentication response indicating that the terminal device is to proceed with the transaction, the authentication response including one or more payment details of a first payment mode of the plurality of payment modes with which to proceed with the transaction, wherein the transaction is processed by the terminal device based on the authentication response.

2. The method of claim 1, further comprising selecting, by the electronic chip, the first payment mode from the plurality of payment modes based on one or more selection parameters, wherein the one or more selection parameters include at least one of a frequency of use of the first payment mode, a merchant category associated with the transaction, or a spending limit assigned to the first payment mode.

3. The method of claim 1, further comprising:
   receiving, by the electronic chip from the terminal device, a first request to communicate the one or more details of the plurality of payment modes to the terminal device, when the first payment mode is rejected by the user or when a transaction amount of the transaction is to be split across at least two payment modes of the plurality of payment modes; and
   communicating, by the electronic chip to the terminal device, the one or more details of the plurality of payment modes for processing the transaction.

4. The method of claim 1, further comprising:
   receiving, by the electronic chip from a user device, the one or more details of the plurality of payment modes and the second authentication parameter; and
   storing, by the electronic chip, the one or more details of the plurality of payment modes and the second authentication parameter therein.

5. The method of claim 4, further comprising updating, by the electronic chip, the one or more details of the plurality of payment modes based on an update request received from at least one of the user device or the terminal device.

6. The method of claim 1, wherein the electronic chip is placed on a wearable device of the user.

7. The method of claim 1, wherein the electronic chip is attached to skin of the user.

8. An electronic chip of a payment device for conducting a transaction, the electronic chip comprising:
   circuitry configured to:
   store a first authentication parameter and one or more details of a plurality of payment modes of a user,
   receive, from a terminal device that is separate from the electronic chip of the payment device, an authentication request including a second authentication parameter of the user acquired at the terminal device when the transaction is initiated at the terminal device,
   compare the second authentication parameter with the first authentication parameter, and
   authenticate the user based on the comparison; and
   communicate, to the terminal device, based on the authentication, an authentication response indicating that the terminal device is to proceed with the transaction, the authentication response including one or more details of a first payment mode of the plurality of payment modes with which to proceed with the transaction, wherein the transaction is processed by the terminal device based on the authentication response.

9. The electronic chip of claim 8, wherein the circuitry is further configured to select the first payment mode from the plurality of payment modes based on one or more selection parameters, and wherein the one or more selection parameters include at least one of a frequency of use of the first payment mode, a merchant category associated with the transaction, or a spending limit assigned to the first payment mode.

10. The electronic chip of claim 8, wherein the circuitry is further configured to:
    receive, from the terminal device, a first request to communicate the one or more details of the plurality of payment modes to the terminal device, when the first payment mode is rejected by the user or when a transaction amount of the transaction is to be split across at least two payment modes of the plurality of payment modes, and
    communicate, to the terminal device, the one or more details of the plurality of payment modes for processing the transaction.

11. The electronic chip of claim 8, wherein the circuitry is further configured to: receive, from a user device, the one or more details of the plurality of payment modes and the first authentication parameter, and store the one or more details of the plurality of payment modes and the first authentication parameter therein.

12. The electronic chip of claim 11, wherein the circuitry is further configured to update the one or more details of the plurality of payment modes, based on an update request received from at least one of the user device or the terminal device.

13. The electronic chip of claim 8, wherein the electronic chip is placed on a wearable device of the user.

14. The electronic chip of claim 8, wherein the electronic chip is attached to skin of the user.

15. A system for conducting a transaction, the system comprising:

a terminal device configured to receive a first authentication parameter of a user when a transaction is initiated by the user at the terminal device; and an electronic chip of a payment device that is separate from and is communicatively coupled to the terminal device, the electronic chip configured to:

store a second authentication parameter and one or more details of a plurality of payment modes of the user, receive, from the terminal device, an authentication request including the first authentication parameter when the transaction is initiated at the terminal device, compare the first authentication parameter with the second authentication parameter, authenticate the user based on the comparison, and communicate, to the terminal device, based on the authentication, an authentication response indicating that the terminal device is to proceed with the transaction, the authentication response including one or more details of a first payment mode of the plurality of payment modes with which to proceed with the transaction, wherein the transaction is processed based on the authentication response.

16. The system of claim 15, wherein the terminal device is further configured to:

render a graphical interface for presenting the one or more details of the first payment mode received from the electronic chip, receive a selection of the first payment mode, and generate an authorization request for processing the transaction based on the selection of the first payment mode.

17. The system of claim 15, wherein the terminal device is further configured to:

communicate, to the electronic chip, a first request for obtaining the one or more details of the plurality of payment modes when the first payment mode is rejected by the user or when a transaction amount of the transaction is to be split across at least two payment modes of the plurality of payment modes, receive, from the electronic chip, the one or more details of the plurality of payment modes based on the first request, present the received one or more details of the plurality of payment modes on a graphical interface, receive a selection of one or more payment modes of the plurality of payment modes, and generate an authorization request for processing the transaction based on the selection of the one or more payment modes.

18. The system of claim 15, wherein each of the plurality of payment modes is one of a transaction card or a digital wallet.

19. The system of claim 15, wherein the terminal device is further configured to:

detect a presence of the electronic chip within a pre-determined distance from the terminal device when the transaction is initiated at the terminal device, and establish a bi-directional communication link between the terminal device and the electronic chip based on the detection of the presence of the electronic chip within the pre-determined distance, wherein the bi-directional communication link communicatively couples the electronic chip to the terminal device, and wherein the authentication request is communicated to the electronic chip using the bi-directional communication link.

20. The system of claim 15, wherein the electronic chip is attached to one of skin of the user or a wearable device of the user.

* * * * *